US 7,838,845 B2

(12) United States Patent
Abe et al.

(10) Patent No.: US 7,838,845 B2
(45) Date of Patent: Nov. 23, 2010

(54) ULTRAVIOLET IRRADIATION WATER TREATMENT APPARATUS

(75) Inventors: Norimitsu Abe, Kawasaki (JP); Takeshi Ide, Yamato (JP); Takahiro Soma, Kawasaki (JP); Seiichi Murayama, Fuchu (JP); Masao Kaneko, Siatama (JP); Shojiro Tamaki, Nishitokyo (JP); Masumi Nakadate, Yokohama (JP); Akira Morikawa, Kitakatsushika-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 146 days.

(21) Appl. No.: 12/106,890

(22) Filed: Apr. 21, 2008

(65) Prior Publication Data

US 2008/0203004 A1  Aug. 28, 2008

Related U.S. Application Data

(63) Continuation of application No. PCT/JP2006/322006, filed on Nov. 2, 2006.

(30) Foreign Application Priority Data

Nov. 2, 2005 (JP) ............................ 2005-319820
Mar. 13, 2006 (JP) ............................ 2006-068061

(51) Int. Cl.
*B01D 35/06* (2006.01)
(52) U.S. Cl. ............... 250/432 R; 250/435; 250/436; 250/437; 250/438; 250/504 R
(58) Field of Classification Search ............ 250/428, 250/430, 431, 432 R, 435, 436, 437, 438, 250/504 R, 492.1, 493.1, 494.1
See application file for complete search history.

(56) References Cited

U.S. PATENT DOCUMENTS

| | | | | | |
|---|---|---|---|---|---|
| 3,138,708 | A | * | 6/1964 | Marx et al. | 250/431 |
| 4,043,886 | A | * | 8/1977 | Bierker et al. | 204/157.76 |
| 5,503,800 | A | * | 4/1996 | Free | 422/24 |
| 5,512,253 | A | * | 4/1996 | Woodbridge et al. | 422/186 |
| 5,528,044 | A | * | 6/1996 | Hutchison | 250/431 |
| 5,675,153 | A | * | 10/1997 | Snowball | 250/438 |
| 5,725,757 | A | * | 3/1998 | Binot | 210/85 |
| 6,332,981 | B1 | * | 12/2001 | Loyd | 210/198.1 |

(Continued)

FOREIGN PATENT DOCUMENTS

JP  3-019591 U  2/1991

(Continued)

OTHER PUBLICATIONS

Office Action dated Mar. 15, 2010 from corresponding Canadian Patent Appln. No. 2,626,517.

*Primary Examiner*—Jack I Berman
*Assistant Examiner*—Michael J Logie
(74) *Attorney, Agent, or Firm*—Ohlandt, Greeley, Ruggiero & Perle, L.L.P.

(57) ABSTRACT

An ultraviolet irradiation water treatment apparatus includes a vessel having a cylindrical side portion, and plural rod-shaped ultraviolet lamps are disposed in parallel with a central axis of the side portion in the vessel. A water inlet pipe through which water flows into the vessel is provided in an outer wall of the side portion at a position in a tangential direction of an inner periphery of the side portion.

8 Claims, 35 Drawing Sheets

U.S. PATENT DOCUMENTS

| | | |
|---|---|---|
| 6,911,655 B2 * | 6/2005 | Snowball .................... 250/431 |
| 7,217,358 B2 * | 5/2007 | Evans ....................... 210/195.1 |
| 2002/0096648 A1 * | 7/2002 | Kaiser et al. ............. 250/492.1 |
| 2007/0045197 A1 * | 3/2007 | Ogut et al. .................. 210/748 |

FOREIGN PATENT DOCUMENTS

| | | | |
|---|---|---|---|
| JP | 02-095943 U | | 5/1992 |
| JP | 09-503160 T | | 3/1997 |
| JP | 2000070928 | * | 8/1998 |
| JP | 2000-070928 A | | 3/2000 |
| JP | 2001-516637 T | | 10/2001 |
| JP | 2003-024934 A | | 1/2003 |
| JP | 2004-512905 T | | 4/2004 |
| WO | WO9402680 | * | 2/1994 |
| WO | WO 03/092392 A1 | | 11/2003 |

* cited by examiner

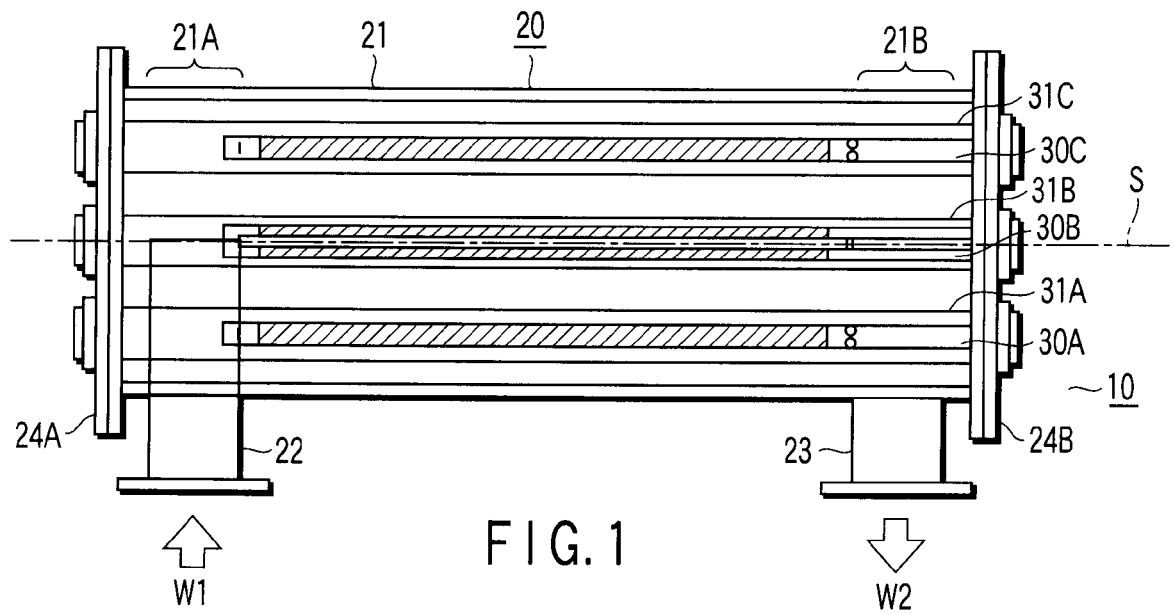
F I G. 1
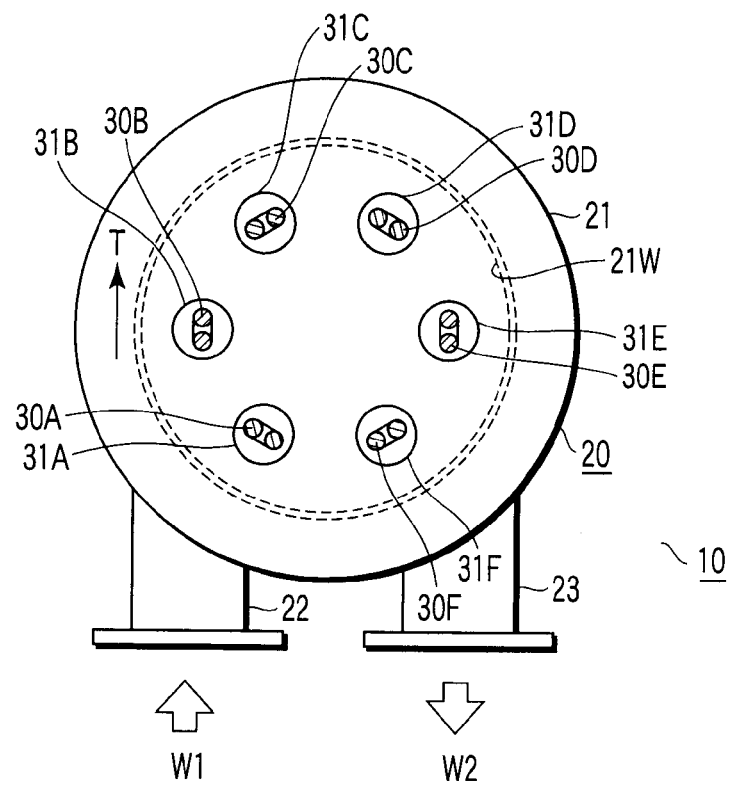
F I G. 2

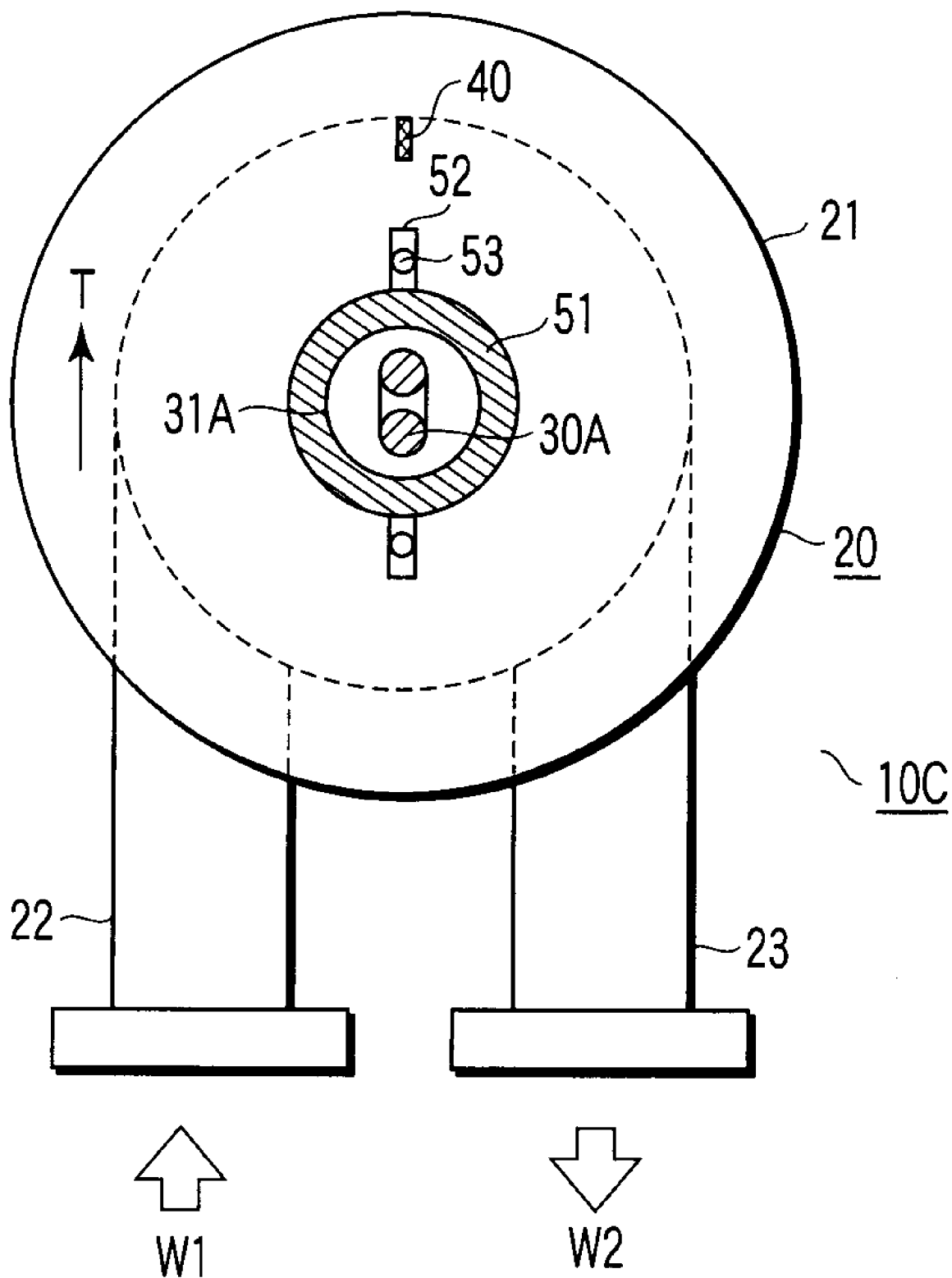
F I G. 11

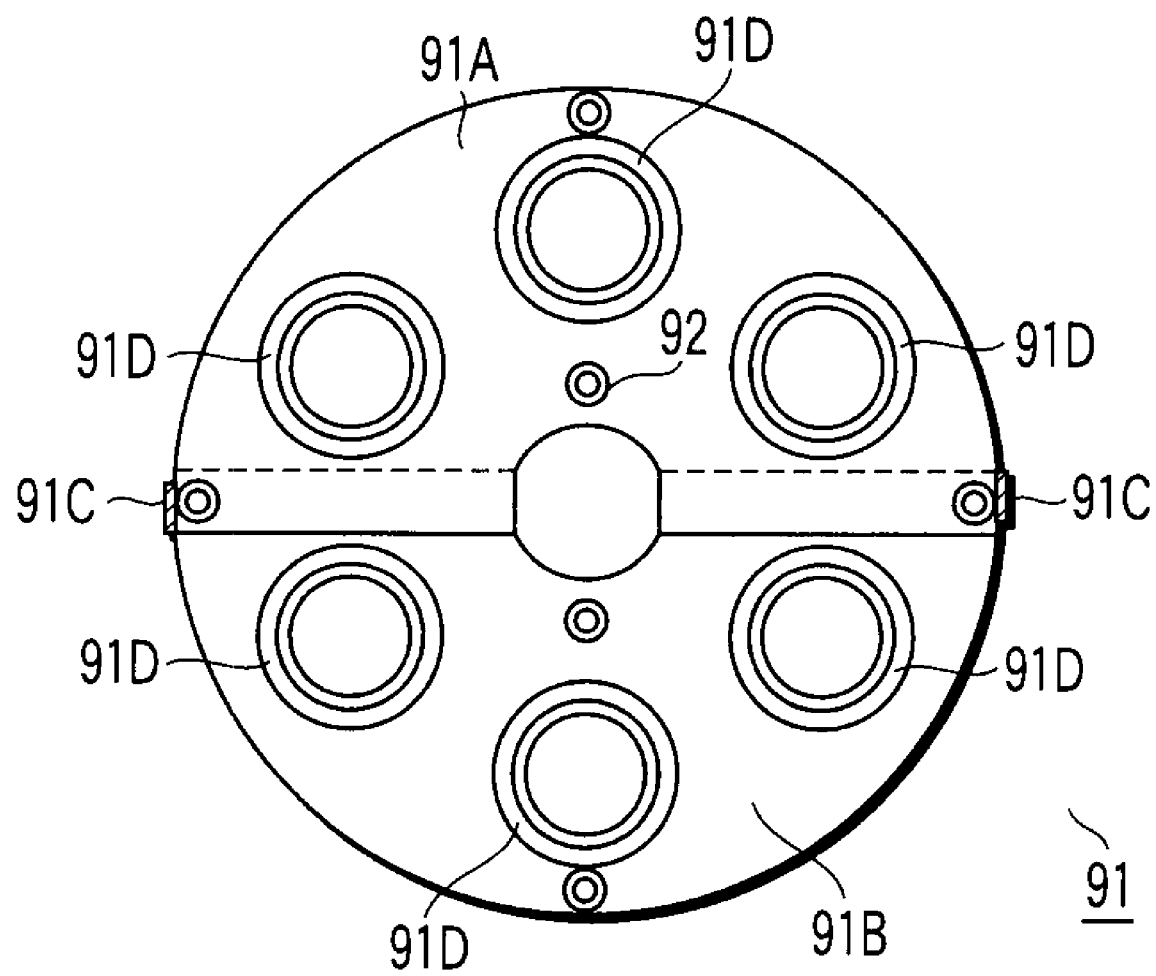
F I G. 20

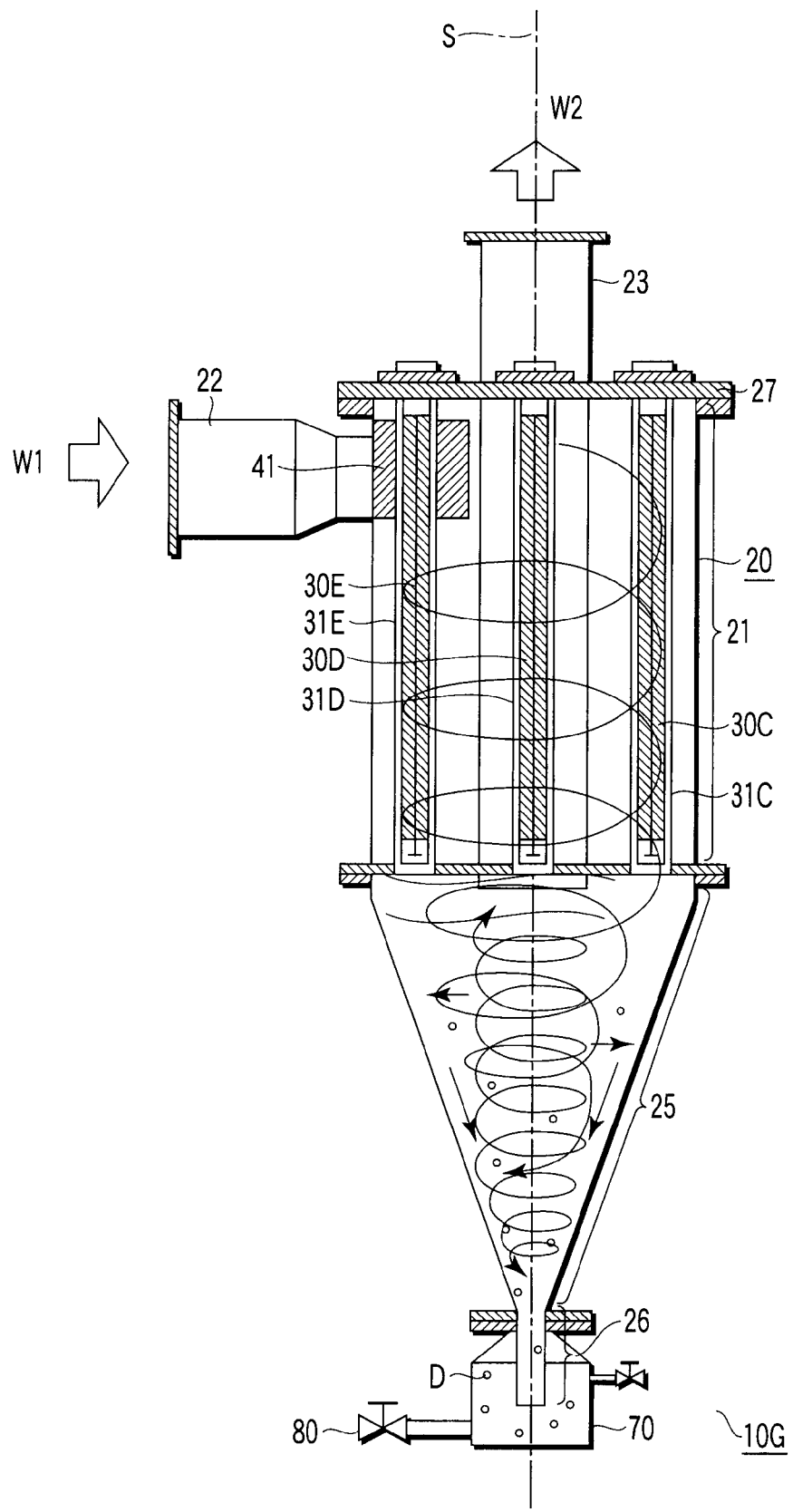
F I G. 21

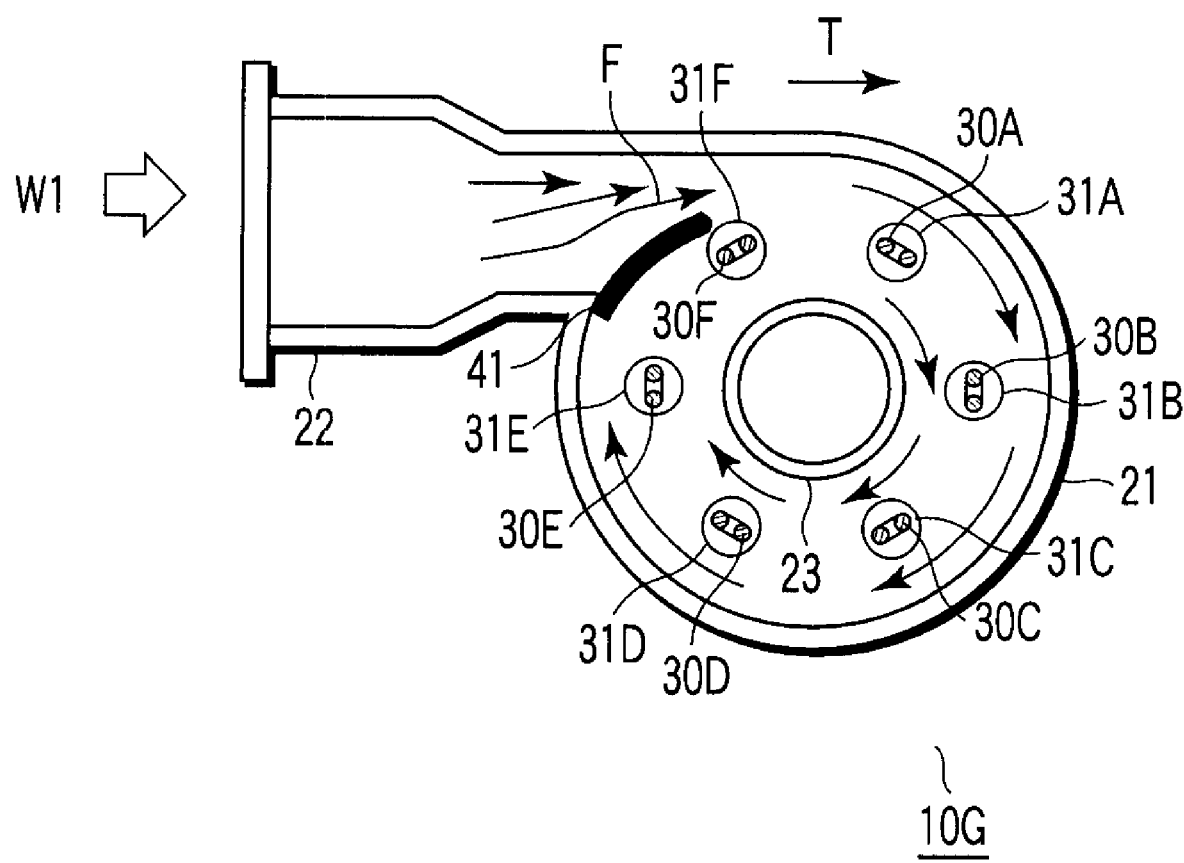
F I G. 22

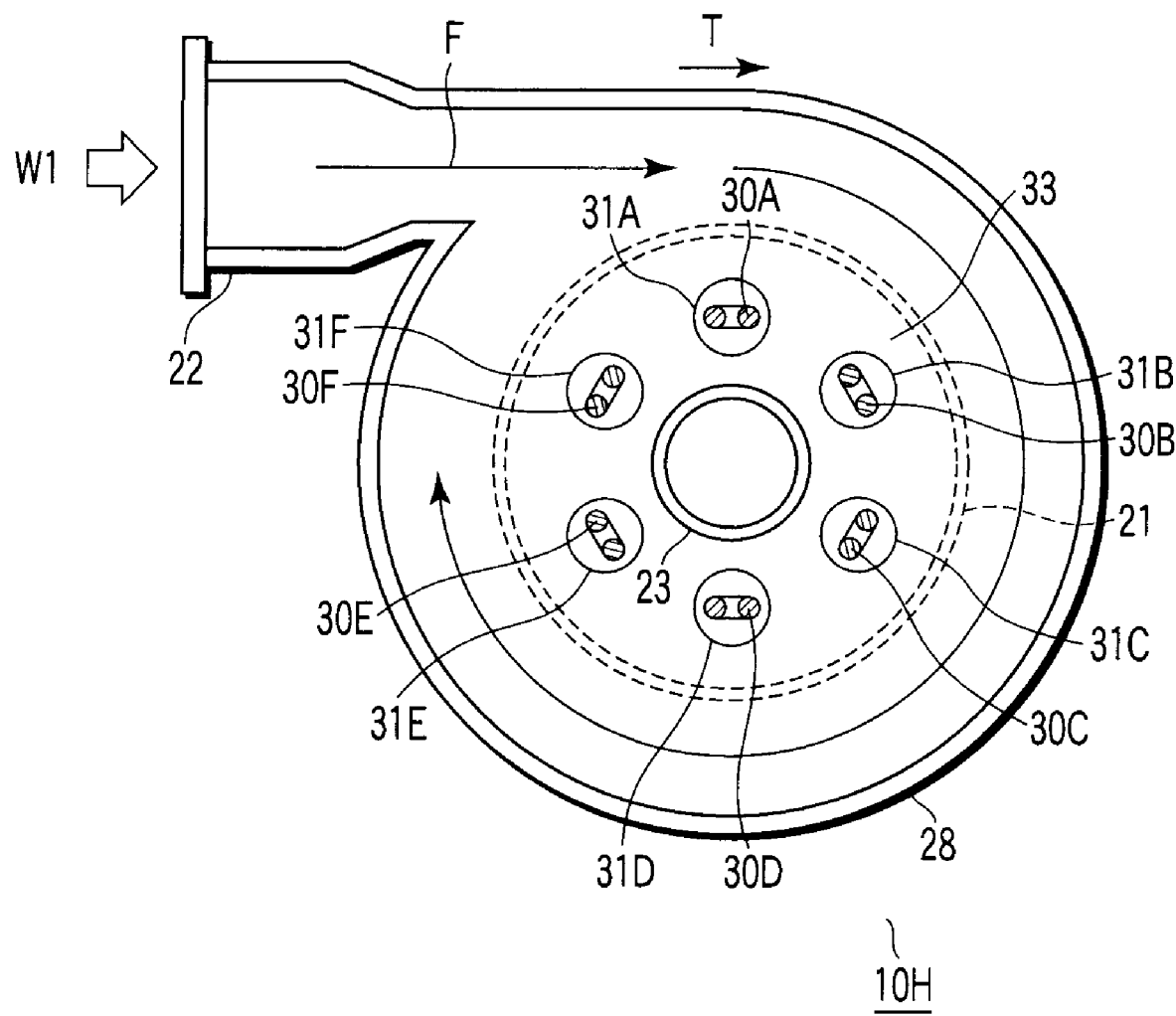
F I G. 24

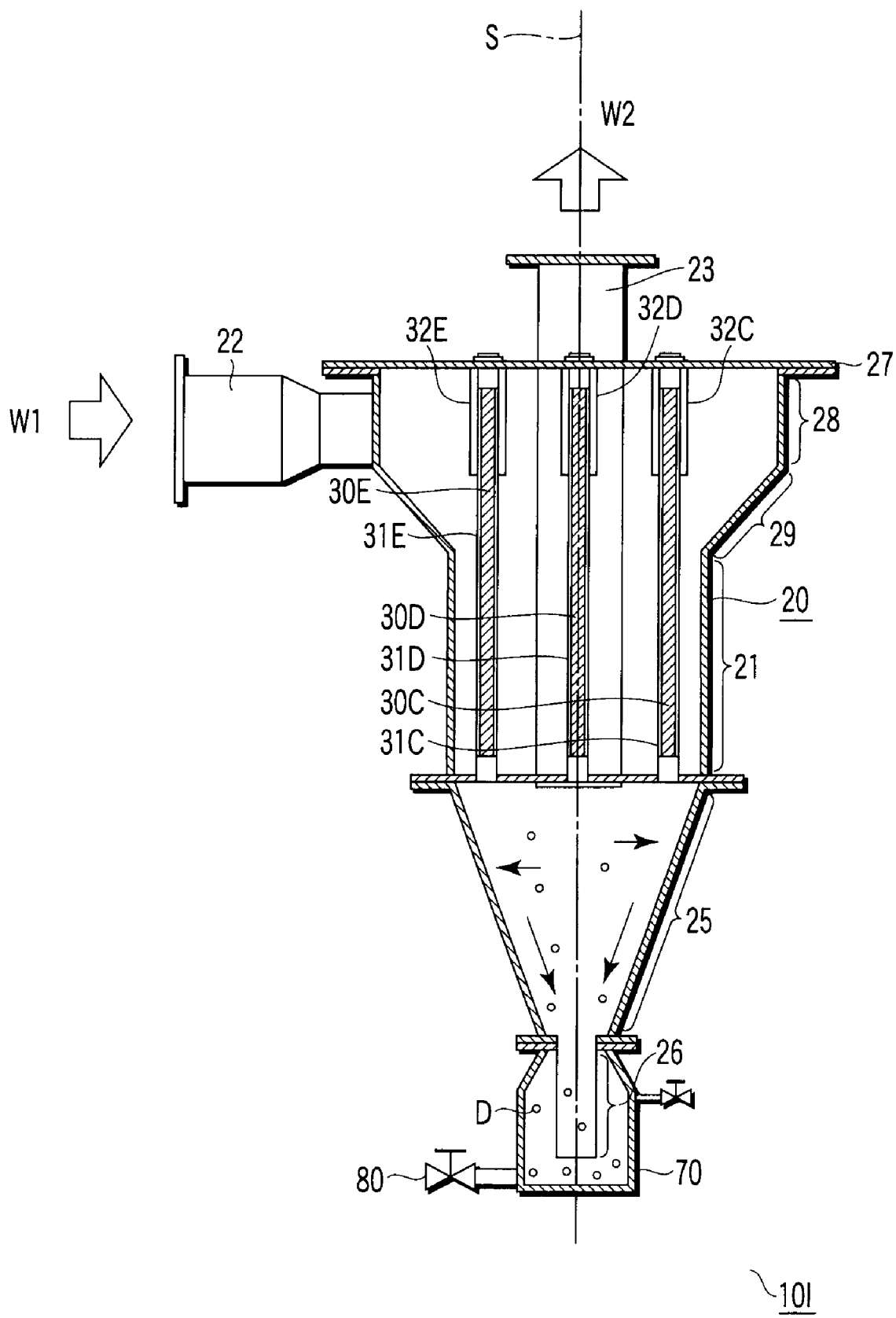
F I G. 25

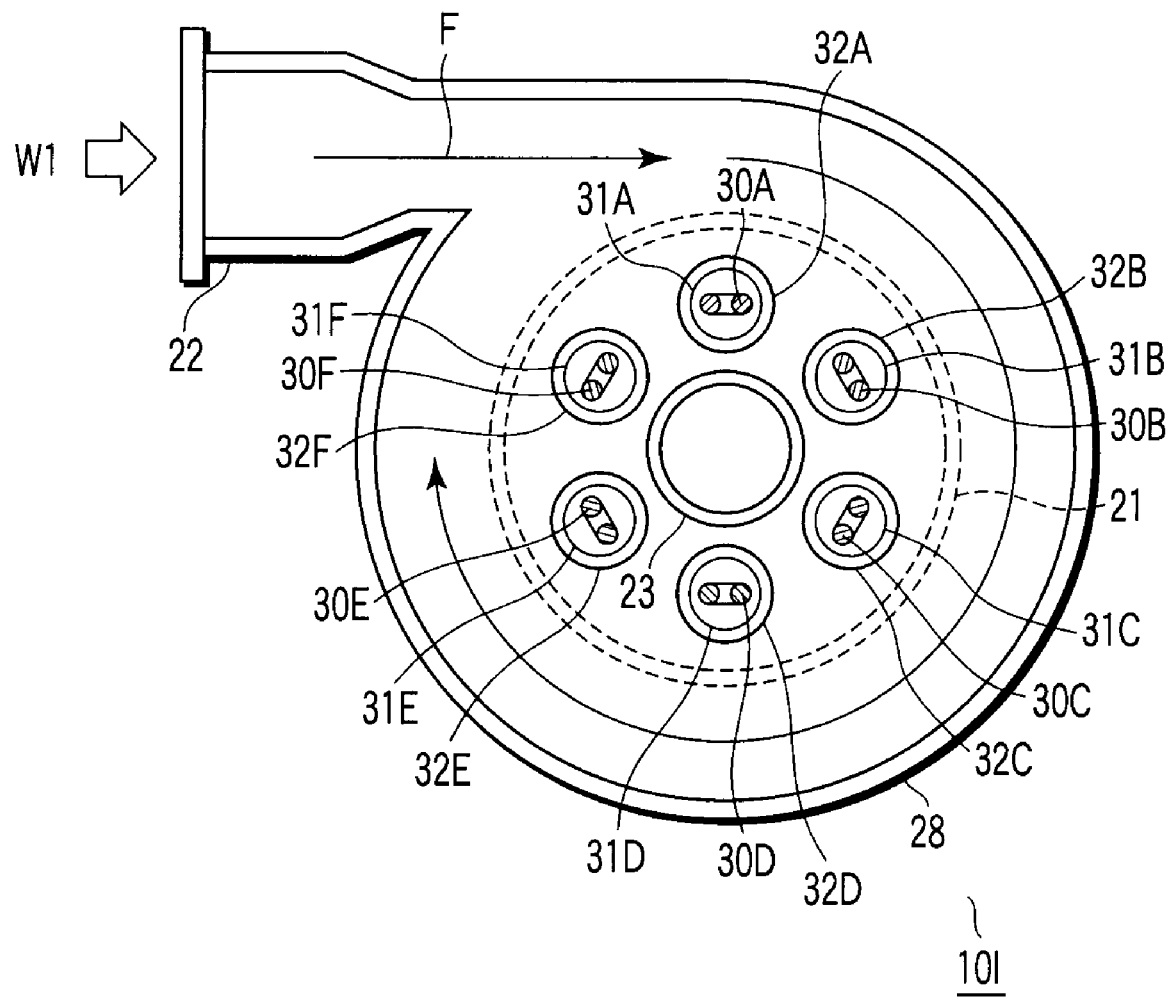
F I G. 26

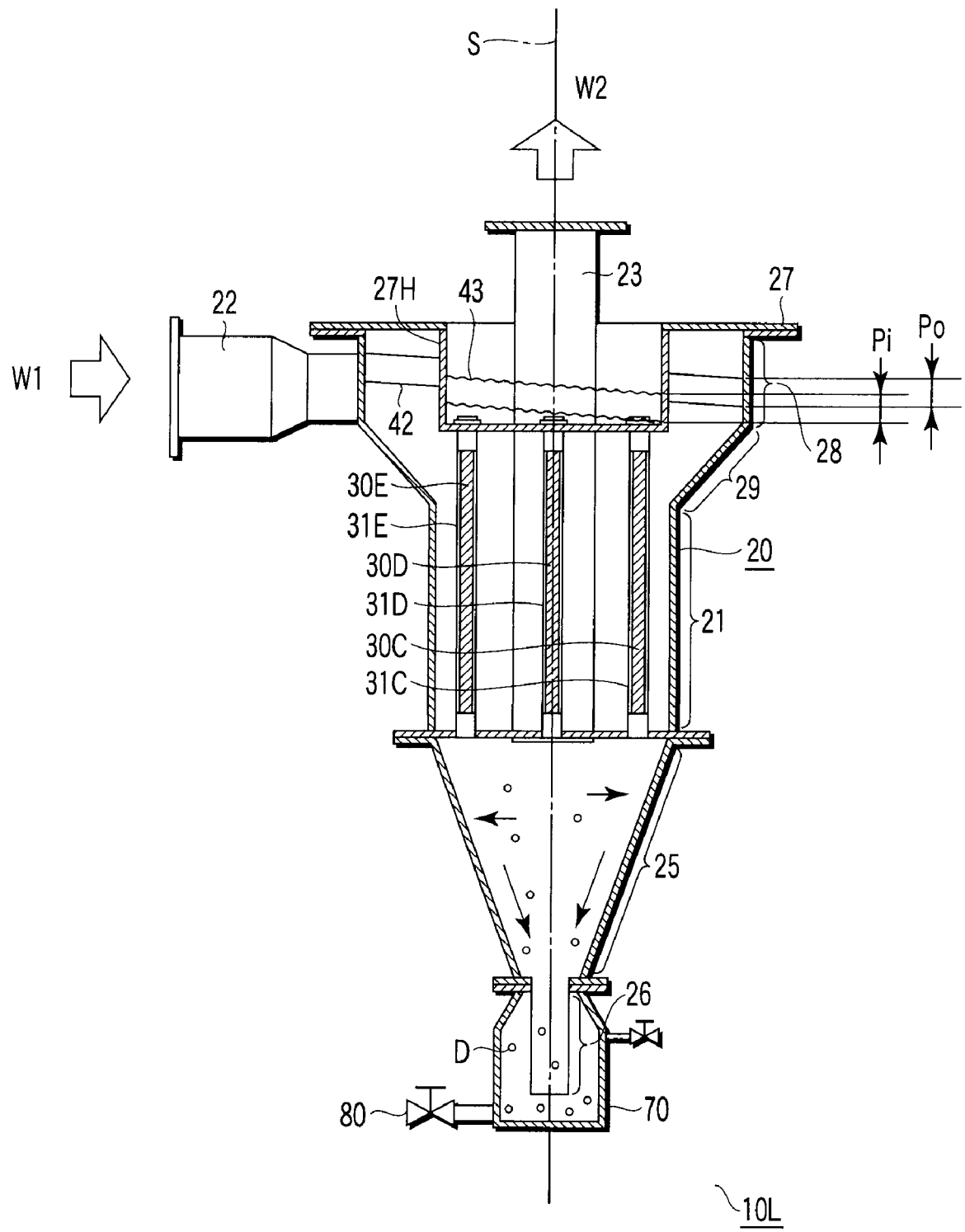
F I G. 31

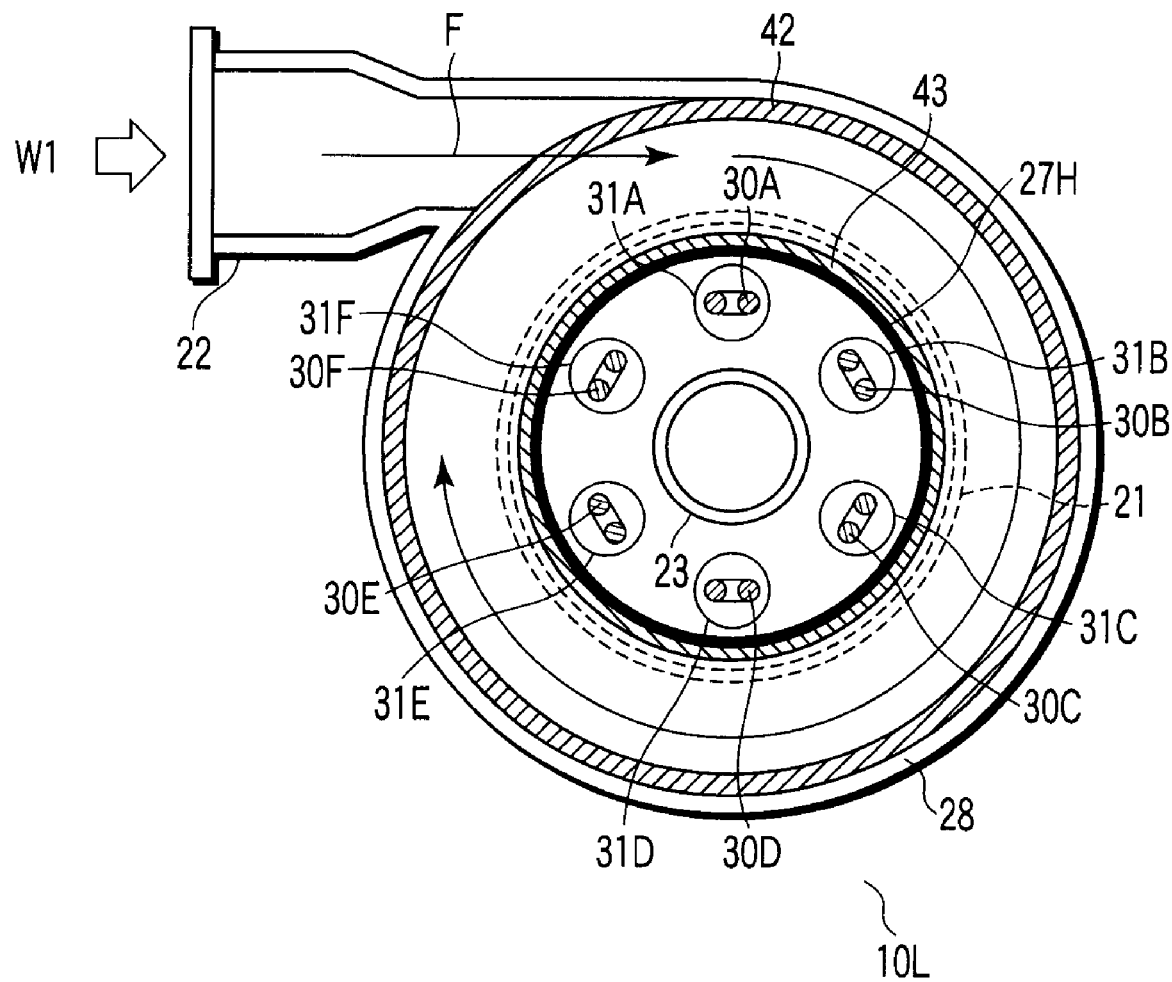
F I G. 32

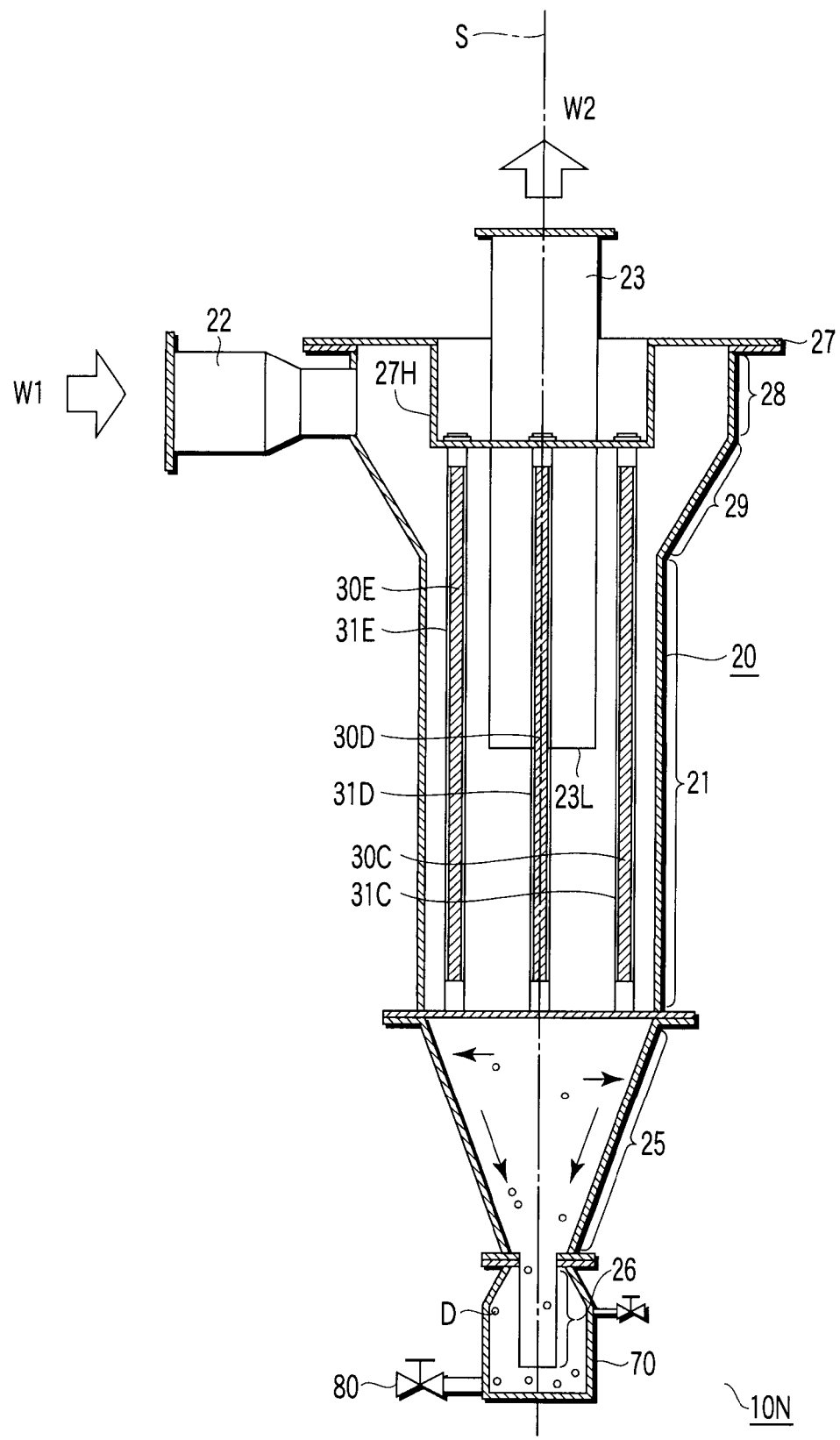
F I G. 35

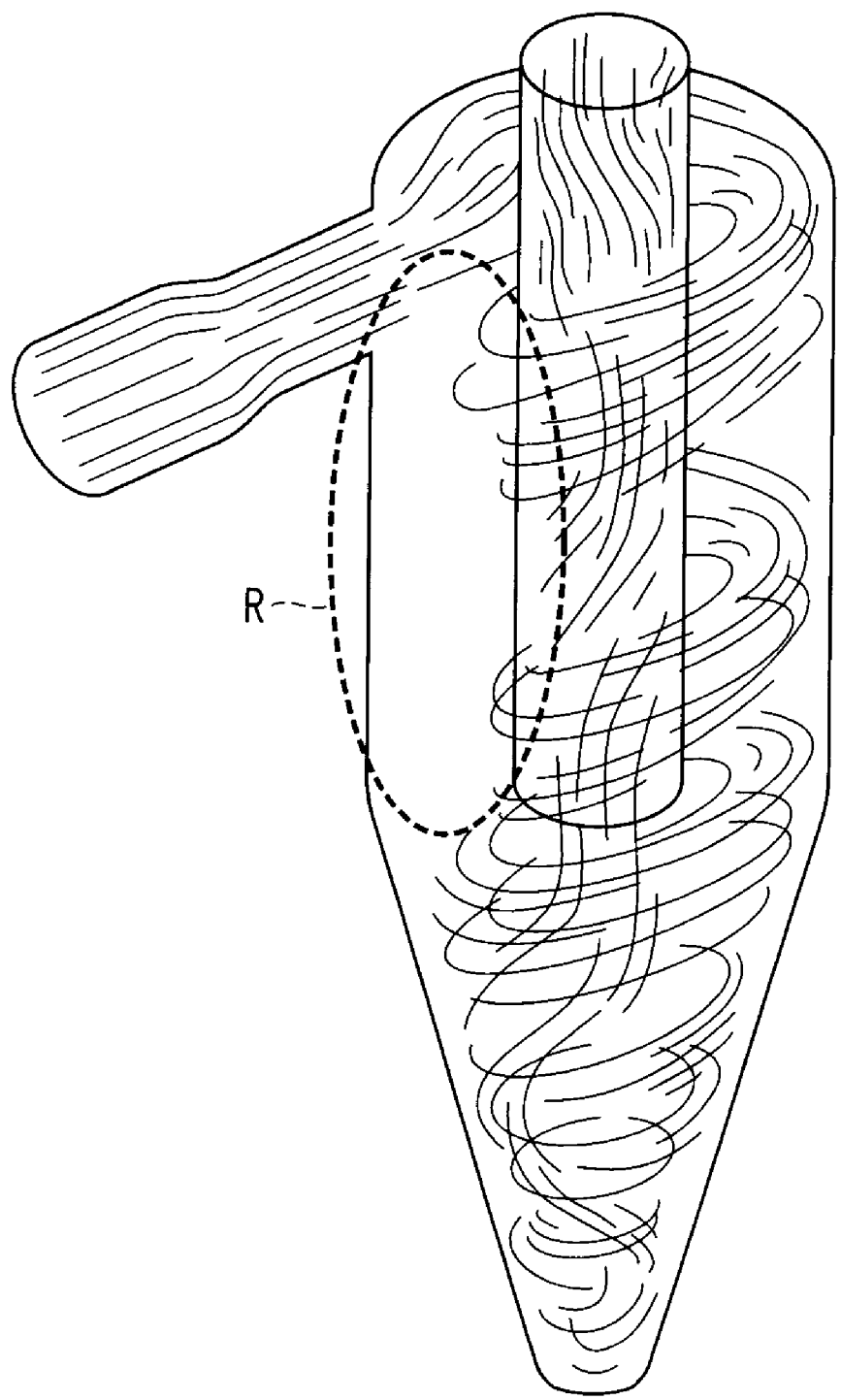
F I G. 37

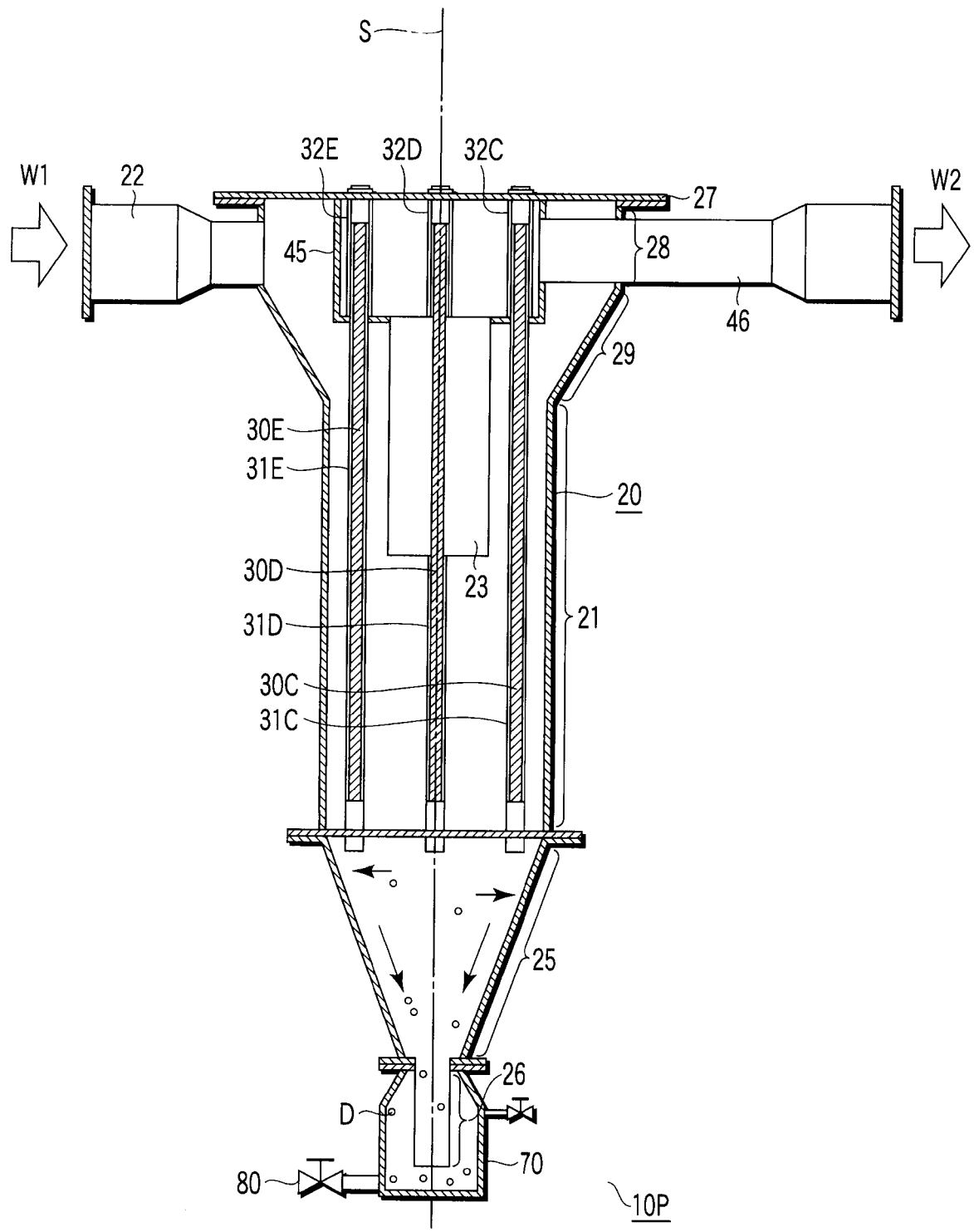
F I G. 39

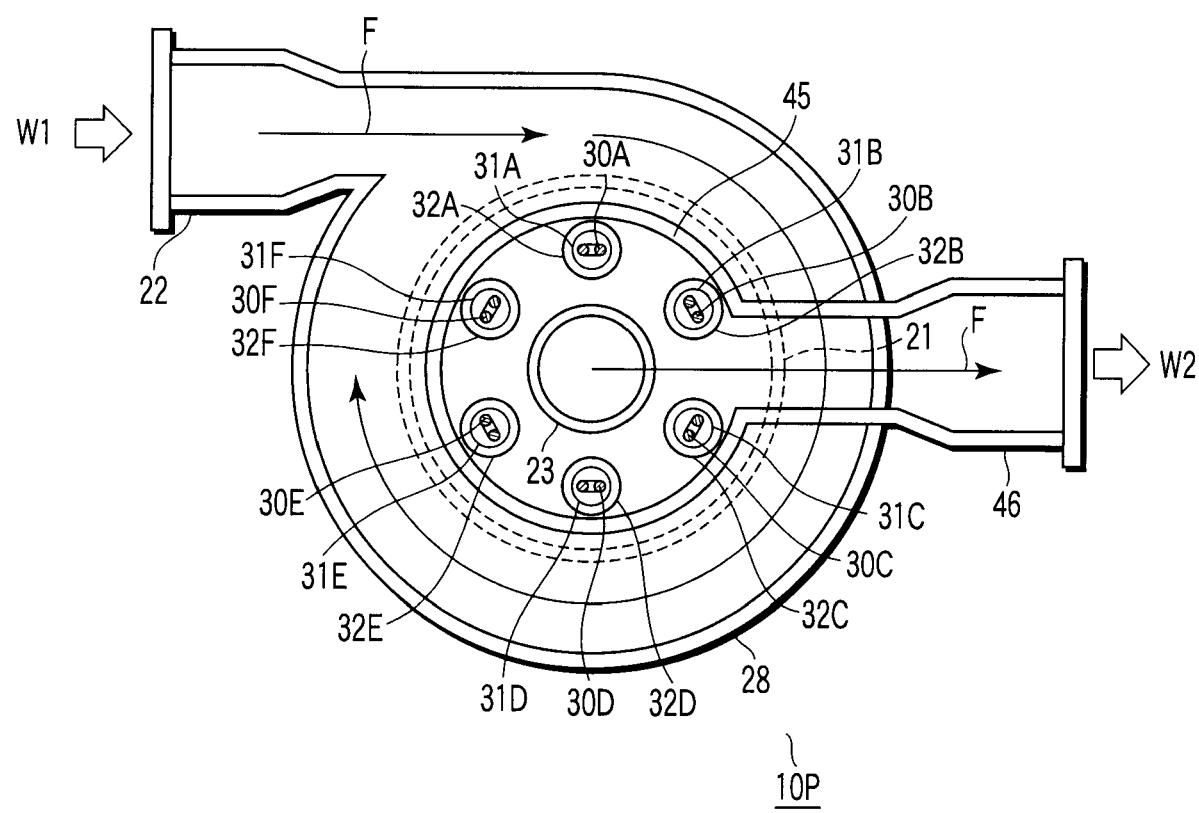
F I G. 40

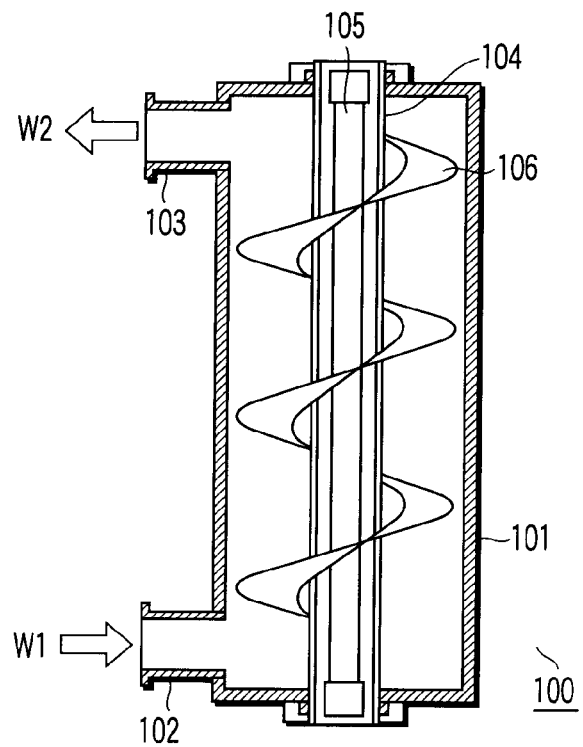
F I G. 41
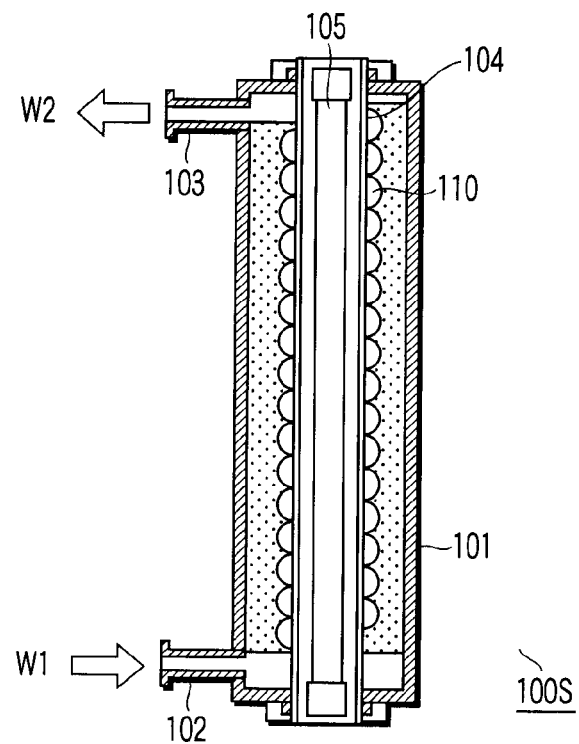
F I G. 42

ULTRAVIOLET IRRADIATION WATER TREATMENT APPARATUS

CROSS-REFERENCE TO RELATED APPLICATIONS

This is a Continuation Application of PCT Application No. PCT/JP2006/322006, filed Nov. 2, 2006, which was published under PCT Article 21(2) in Japanese.

This application is based upon and claims the benefit of priority from prior Japanese Patent Applications No. 2005-319820, filed Nov. 2, 2005; and No. 2006-068061, filed Mar. 13, 2006, the entire contents of both of which are incorporated herein by reference.

BACKGROUND OF THE INVENTION

1. Field of the Invention

The present invention relates to an ultraviolet irradiation water treatment apparatus which irradiates water with an ultraviolet ray to inactivate or detoxify algae, microbes, pathogenic protozoa, and the like in a water-purifying treatment, a sewage treatment, a food effluent treatment, a chemical effluent treatment, a deep-sea vessel ballast water treatment, and the like, for example, and to an ultraviolet irradiation water treatment apparatus of high ultraviolet irradiation efficiency.

2. Description of the Related Art

Conventionally, waterworks in Japan are managed based on sanitarian safety by chlorination.

Recently, water system contamination problems have been generated by new and reconstructed pathogenic microbes such as cryptosporidium and Giardia. There are also the problems of mass generation of algae with the progress of eutrophication, which is organic matter pollution, in lakes, dams, and rivers, which are water service resources. The mass generation of algae causes an unusual odor and taste, discoloring, aggregation, sedimentation inhibition, filter clogging, and filtrate water leakage problems. Additionally, a chlorine agent injected for the purpose of disinfection reacts with the organic matter in raw water to produce toxic by-products such as trihalomethane.

The improvement in management of a basic pattern in which the aggregation, filtration, and chlorination are sequentially performed is being studied to solve these problems for conventional waterworks in Japan.

Specifically, use of ultraviolet disinfection, in which water is irradiated with an ultraviolet ray, is now replacing the conventional chlorination method. In ultraviolet disinfection, disadvantageously complicated chemical injection control is not required, and no toxic by-products such as trihalomethane are generated. Ultraviolet disinfection is also highly effective at suppressing the proliferation of cryptosporidium, which reduces infectability thereof. Therefore, sometimes an ultraviolet irradiation treatment is performed to oxidize and disinfect residue organics at water purification works.

In ultraviolet disinfection, usually, filtered water or aggregated and sedimented water is irradiated, as this provides high ultraviolet transmission efficiency. However, sometimes the raw water is irradiated with an ultraviolet ray in order to improve the aggregation or to eliminate the infectability of pathogenic protozoa such as cryptosporidium. That is, the raw water is irradiated with an ultraviolet ray instead of use of prechlorination.

Ultraviolet irradiation also effectively prevents the reproduction of algae, which is desired in the water-purifying treatment.

Where ultraviolet irradiation is used to kill pathogenic microbes or protozoa, ultraviolet in the wavelength range of 200 nm to 300 nm, which is called the UV-C band, is effective. A low-pressure or medium-pressure mercury lamp in which mercury vapor is enclosed in a lamp is used to generate a UV-C band ultraviolet ray.

An apparatus in which one or plural ultraviolet lamps are disposed in parallel is well known as an apparatus for irradiating water with an ultraviolet ray (see "ULTRAVIOLET DISINFECTION GUIDANCE MANUAL", United States Environmental Protection Agency, June 2003, Draft).

However, the ultraviolet irradiation dose necessary to inactivate pathogenic protozoa, microbes, and virus, which are disinfection targets, depends on the microbial species in question. Therefore, it is necessary for the water containing the pathogenic protozoa, bacteria, and virus, which are the disinfection targets, to be effectively irradiated with an ultraviolet ray within the period of time the water is present in the ultraviolet irradiation water treatment apparatus.

Since the intensity of an ultraviolet ray is decreased in inverse proportion to the square of the distance from the ultraviolet lamp, in order to effectively irradiate the water with the ultraviolet ray, it is necessary to cause the water to pass near the ultraviolet lamp.

Therefore, Jpn. Pat. Appln. KOKAI Publication No. 9-503160 discloses a method in which a spiral guide vane is disposed in order that the water flows while swirling in an outer periphery of the ultraviolet lamp, and Jpn. Pat. Appln. KOKAI Publication Nos. 2004-512905 and 2001-516637 disclose a method in which a secondary flow, such as a vortex flow, is induced such that the whole body of water passes near the ultraviolet lamp.

The configuration shown in FIG. 41 can be cited as an example of a conventional ultraviolet irradiation water treatment apparatus 100.

In the ultraviolet irradiation water treatment apparatus 100, water W1 enters from a water inlet pipe 102 located in a lower portion of a cylindrical vessel 101, and the water W1 rises in an axial direction of the vessel 101. Then, the water W1 flows out from a water outlet pipe 103 located in an upper portion of the vessel 101. An ultraviolet lamp 105 surrounded by a protective tube 104 is disposed along a central axis of the cylindrical vessel 101. A spiral guide vane 106 is disposed in the vessel 101. In an ultraviolet irradiation water treatment apparatus 100 having the above-described configuration, the water W1 flows while swirling around the ultraviolet lamp 105 along the spiral guide vane 106. Therefore, the whole body of water W1 can evenly be irradiated with the ultraviolet ray.

The configuration shown in FIG. 42 can be cited as another example of a conventional ultraviolet irradiation water treatment apparatus, 100S. In FIG. 42, the same components as those in FIG. 41 are designated by the same numerals, and an overlapping description is omitted.

In the ultraviolet irradiation water treatment apparatus 100S, the water W1 flows in from the water inlet pipe 102 formed in the lower portion of the cylindrical vessel 101, and the water W1 rises in the axial direction of the vessel 101. Then, the water W1 flows out from the water outlet pipe 103 formed in the upper portion of the vessel 101. The ultraviolet lamp 105 surrounded by the protective tube 104 is disposed in the central axis of the cylindrical vessel 101. A spiral flow path 110 having a semicircular shape in section is formed in an inner wall surface of the cylindrical vessel 101 so as to surround the ultraviolet lamp 105. That is, in the ultraviolet irradiation water treatment apparatus 100S having the configuration shown in FIG. 42, the water W1 flows in from the water inlet pipe 102, and the water W1 passes through the spiral flow path 110. This enables the water W1 to flow while swirling in the outer periphery of the ultraviolet lamp 105. Therefore, the whole body of water W1 can evenly be irradiated with an ultraviolet ray. Because the spiral flow path 110 has a semicircular shape in section, a vortex flow is induced as a secondary flow of the fluid. Therefore, the water W1 passes near the ultraviolet lamp 105, and the water W1 can efficiently be irradiated with an ultraviolet ray.

However, there are the following problems in the conventional ultraviolet irradiation water treatment apparatus.

(A) In the case where plural ultraviolet lamps are used to treat a large amount of water, the structure of the apparatus necessarily becomes more complicated, which could increase the risk of failure. Additionally, the production cost is high since the apparatus has a complicated structure.

(B) In order to treat a large amount of water, it has also been considered to dispose plural ultraviolet lamps in parallel with the direction in which the water flows. However, in the case where plural ultraviolet lamps are disposed, and one of the lamps has broken, the neighborhood of the broken ultraviolet lamp is insufficiently irradiated with ultraviolet rays, since the ultraviolet rays from the surrounding ultraviolet lamps are blocked by the broken ultraviolet lamp.

(C) Crystal quartz or synthetic quartz is used as a material for the protective tube which is disposed to protect the ultraviolet lamp. The crystal quartz or synthetic quartz glass tube is highly fragile, and easily breaks if subjected to slight impact. Therefore, in the case where an ultraviolet lamp is broken, unfortunately, mercury enclosed in the ultraviolet lamp leaks into the water, or fragments of the quartz glass tube constituting the ultraviolet lamp and protective tube are mixed into the water.

BRIEF SUMMARY OF THE INVENTION

According to an aspect of the present invention, there is provided an ultraviolet irradiation water treatment apparatus which causes water to flow in, performs an ultraviolet ray irradiation treatment, and causes treated water to flow out, wherein the apparatus main body includes a vessel having a cylindrical side portion, an inside of the vessel includes: a plurality of rod-shaped ultraviolet lamps which are disposed in parallel with a central axis of the side portion; and a plurality of protective tubes which are separately disposed to protect each ultraviolet lamp so as to surround each ultraviolet lamp, and an outer wall of the vessel includes: a water inlet pipe which is provided in a tangential direction of an inner periphery of the side portion to cause the water to flow in; and a water outlet pipe which causes the treated water to flow out.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a side view showing an ultraviolet irradiation water treatment apparatus 10 according to a first embodiment of the invention.

FIG. 2 is a plan view showing the ultraviolet irradiation water treatment apparatus 10 according to the first embodiment.

FIG. 11 is a plan view showing the ultraviolet irradiation water treatment apparatus 10C according to the second embodiment.

FIG. 20 is a schematic view showing a configuration of a cleaning component 91 according to the fifth embodiment.

FIG. 21 is a side view showing a configuration of an ultraviolet irradiation water treatment apparatus 10G according to a sixth embodiment of the invention.

FIG. 22 is a plan view showing the ultraviolet irradiation water treatment apparatus 10G according to the sixth embodiment.

FIG. 24 is a plan view showing the ultraviolet irradiation water treatment apparatus 10H according to the seventh embodiment.

FIG. 25 is a side view showing a configuration of an ultraviolet irradiation water treatment apparatus 10I according to an eighth embodiment of the invention.

FIG. 26 is a plan view showing the ultraviolet irradiation water treatment apparatus 10I according to the eighth embodiment.

FIG. 31 is a side view showing a configuration of an ultraviolet irradiation water treatment apparatus 10L according to an eleventh embodiment of the invention.

FIG. 32 is a plan view showing the ultraviolet irradiation water treatment apparatus 10L according to the eleventh embodiment.

FIG. 35 is a side view showing a configuration of an ultraviolet irradiation water treatment apparatus 10N according to a thirteenth embodiment of the invention.

FIG. 37 is a view showing a flow of the water W1 in the ultraviolet irradiation water treatment apparatus 10K.

FIG. 39 is a side view showing a configuration of an ultraviolet irradiation water treatment apparatus 10P according to a fourteenth embodiment of the invention.

FIG. 40 is a plan view showing the ultraviolet irradiation water treatment apparatus 10P according to the fourteenth embodiment.

FIG. 41 is a view showing a configuration of a conventional ultraviolet irradiation water treatment apparatus 100.

FIG. 42 is a view showing a configuration of another conventional ultraviolet irradiation water treatment apparatus 100S.

DETAILED DESCRIPTION OF THE INVENTION

Figure 3:
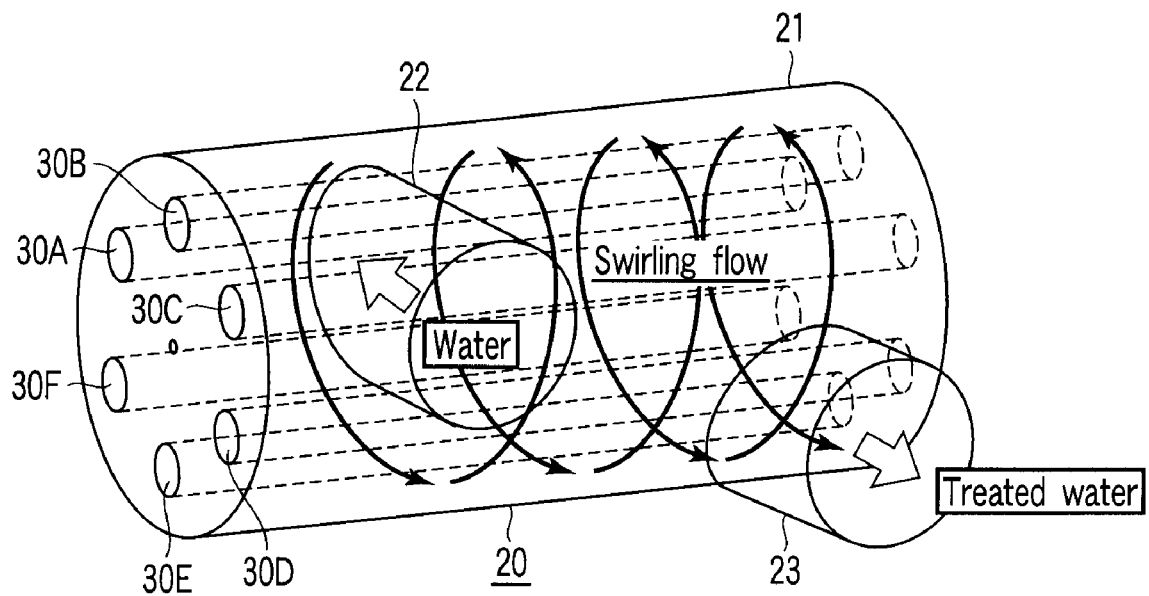
FIG. 3 is a view showing a concept of a swirling flow of water W1 according to the first embodiment.

Embodiments of the present invention will be described, with reference to the accompanying drawings.

First Embodiment

FIG. 1 is a side view showing a configuration of an ultraviolet irradiation water treatment apparatus 10 according to a first embodiment of the invention, and FIG. 2 is a plan view showing the ultraviolet irradiation water treatment apparatus 10.

In the ultraviolet irradiation water treatment apparatus 10, water W1 is caused to flow in, the water W1 is irradiated with the ultraviolet ray, and the treated water W2 is caused to flow out.

A vessel 20 of the ultraviolet irradiation water treatment apparatus 10 includes a cylindrical side portion 21.

A water inlet pipe 22 and a water outlet pipe 23 are provided in an outer wall of the vessel 20. End faces 24A and 24B are provided in both end portions of the vessel 20.

The water inlet pipe 22 is provided in a tangential direction T of an inner periphery of the side portion 21 to cause the water W1 to flow in.

The water outlet pipe 23 is provided in the vessel 20 to cause the treated water W2 to flow out. The water outlet pipe 23 is disposed in an outer wall of the side portion 21 along a flow direction of the water W1 flowing from the water inlet pipe 22. More particularly, the water outlet pipe 23 is provided in the tangential direction of the inner periphery of the side portion 21.

The water inlet pipe 22 and the water outlet pipe 23 are disposed in end portions 21A and 21B which are different from each other in the side portion 21. In other words, the water inlet pipe 22 and the water outlet pipe 23 are connected to the vessel 20 with the central axes of the water inlet pipe 22 and water outlet pipe 23 apart from each other. Inner diameters of the water inlet pipe 22 and water outlet pipe 23 are not more than a half of an inner diameter of the side portion 21.

Ultraviolet lamps 30A to 30F and protective tubes 31A to 31F are disposed inside the vessel 20.

The ultraviolet lamps 30A to 30F are disposed in parallel with a central axis S of the side portion 21. The ultraviolet lamps 30A to 30F are disposed in end surfaces 24A and 24B, and the ultraviolet lamps 30A to 30F are provided at equal intervals on a circumference around the central axis S. Specifically, a quartz tube rod in which electrodes are attached to both ends is formed in a U-shape and used as the ultraviolet lamp. The inside of the quartz tube is in a substantial vacuum state and only mercury vapor is present in the quartz tube. When a high voltage is applied between the electrodes of the quartz tube to generate a discharge, electrons excite the mercury vapor to emit an ultraviolet ray.

In the first embodiment, an ultraviolet lamp, which emits an ultraviolet ray having a wavelength of 200 nm to 300 nm is used, but an ultraviolet lamp which emits an ultraviolet ray having a wavelength of 254 nm is more preferably used. The water W1 is exposed to the ultraviolet ray to detoxify the disinfection target substance in the water. An ultraviolet lamp having a diameter of about 2 to about 10 cm is used.

The protective tubes 31A to 31F protect the ultraviolet lamps 30A to 30F such that the water W1 does not directly contact the ultraviolet lamps 30A to 30F. Therefore, the protective tubes 31A to 31F are separately disposed so as to surround each of the ultraviolet lamps 30A to 30F. The protective tubes 31A to 31F are made of quartz glass, and the protective tubes 31A to 31F are disposed in the end surfaces 24A and 24B.

The action of the ultraviolet irradiation water treatment apparatus 10 according to the first embodiment will be now described.

The water W1 flows into the vessel 20 through the water inlet pipe 22. At this point, because the water inlet pipe 22 is formed in the tangential direction T of the inner periphery of the vessel 20, the water W1 flowing into the vessel 20 swirls (see FIG. 3).

The water W1 becomes such a swirling flow that flow velocity is increased on the side of an inner wall 21W of the side portion 21. At this point, the ultraviolet lamps 30A to 30F emit an ultraviolet ray having a wavelength near 254 nm. The ultraviolet ray having the wavelength near 254 nm acts as a disinfection ray to inactivate cryptosporidium of anti-chlorine microbes, fungi such as microbes and colibacillus, virus, and algae in the water. This enables the water W1 to be disinfected.

The water W1 disinfected by the ultraviolet ray is discharged as the treated water W2 from the water outlet pipe 23. Then, the treated water W2 is delivered to the next water-purifying process or directly supplied to a user.

As described above, according to the ultraviolet irradiation water treatment apparatus 10 according to the first embodiment, the water inlet pipe 22 is provided in the outer peripheral wall of the side portion 21 in the tangential direction T of the inner periphery of the side portion 21, so that the water W1 can swirl. Therefore, the water W1 can flow while effectively contacting the ultraviolet lamps 30A to 30F, and the ultraviolet irradiation efficiency can be increased. In other words, the swirling flow is generated so that the whole of the water W1 can efficiently be irradiated with the ultraviolet ray.

Figure 4:
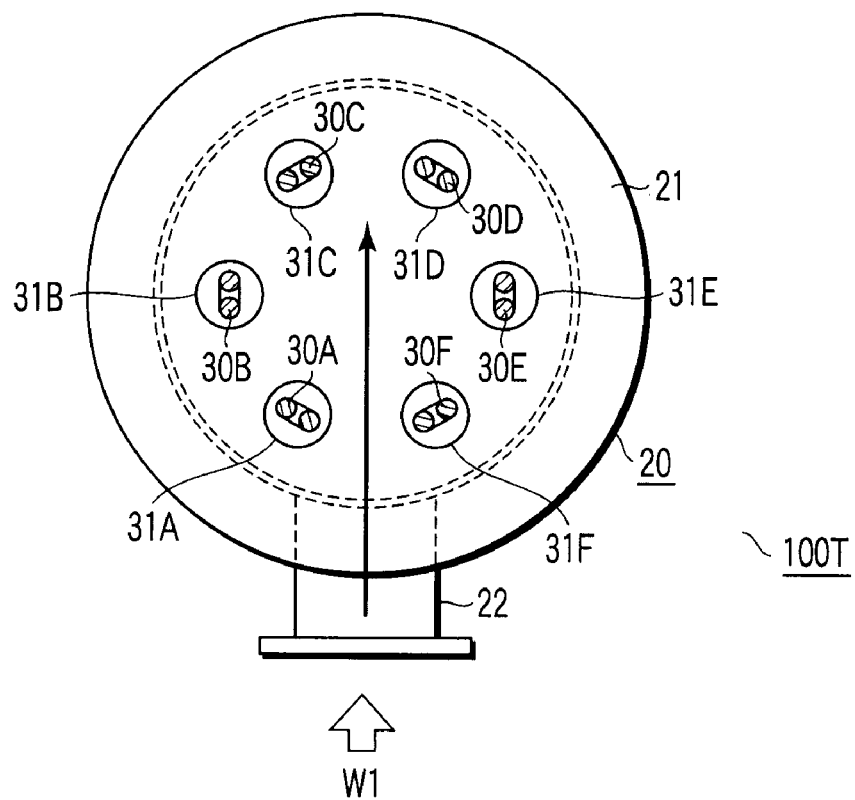
FIG. 4 is a plan view showing a state, in which a position of a water inlet pipe 22 according to the first embodiment is formed, is changed.

That is, the water W1 has uneven flow in the connection portion between the vessel 20 and the water inlet pipe 22 and water outlet pipe 23 in the case where the water inlet pipe 22 and the water outlet pipe 23 are not formed in the tangential direction of the inner periphery of the vessel 20, like a conventional ultraviolet irradiation water treatment apparatus 100T whose plan view is shown in FIG. 4. When the water W1 has a high flow rate, because most of the water W1 flows more smoothly from the water inlet pipe 22 to the water outlet pipe 23, the whole body of water W1 cannot evenly be irradiated with the ultraviolet ray. Because a transit time (irradiation time) in the vessel 20 is decreased, a sufficient ultraviolet dose cannot be applied for the disinfection.

On the contrary, in the ultraviolet irradiation water treatment apparatus 10 according to the first embodiment, the water W1 does not flow smoothly, but has a swirling flow, so that the transit time can be lengthened. The ultraviolet dose (mJ/cm$^2$) is calculated by integration of the ultraviolet illumination (mW/cm$^2$) and irradiation time (sec). In the ultraviolet irradiation water treatment apparatus 10 according to the first embodiment, since the water W1 is irradiated with the ultraviolet dose of 10 mJ/cm$^2$ or more, the infectability of the cryptosporidium to human can be inactivated.

In the ultraviolet irradiation water treatment apparatus 10 according to the first embodiment, the water W1 can evenly be irradiated with the ultraviolet ray even if one of the ultraviolet lamps is broken.

Figure 5:
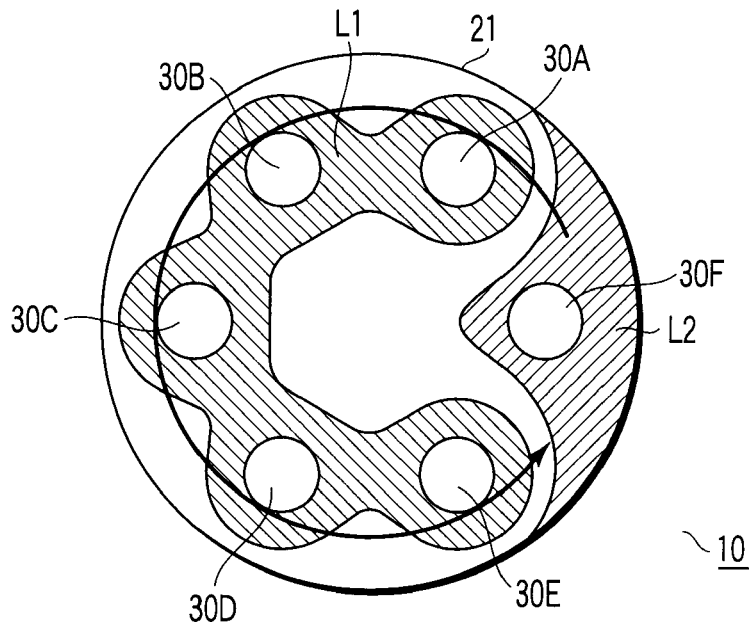
FIG. 5 is a view showing a concept of an illumination distribution in a vessel 20 when an ultraviolet lamp according to the first embodiment is turned off.

That is, when at least one ultraviolet lamp is deteriorated or broken, because an output of the ultraviolet lamp is decreased, the illumination lacks around the ultraviolet lamp whose output is lowered, and insufficient disinfection is possibly performed. For example, FIG. 5 shows the illumination distribution in the vessel 20 in the case where one ultraviolet lamp 30F of the ultraviolet lamps 30A to 30F is turned off. In FIG. 5, the numeral L1 designates a sufficient illumination region and the numeral L2 designates an insufficient illumination region. FIG. 5 is a sectional view showing the side portion 21 of the vessel 20.

On the contrary, in the ultraviolet irradiation water treatment apparatus 10 according to the first embodiment, the water W1 has a swirling flow, so that the water W1 can sufficiently be irradiated with the other lit ultraviolet lamps 30A to 30E, and the disinfection can sufficiently be performed. That is, even if one (30F) of the ultraviolet lamps is broken or turned off, the influence of the turned-off or broken ultraviolet lamp can be reduced.

In the ultraviolet irradiation water treatment apparatus 10 according to the first embodiment, plural ultraviolet lamps 30 are disposed in parallel, and the water flows so as to contact all the ultraviolet lamps, which enhances the irradiation efficiency. Therefore, because the ultraviolet irradiation water treatment apparatus can be downsized, the apparatus is easily incorporated into existing facilities.

Considering that the ultraviolet irradiation water treatment apparatus 10 is used for water-purifying treatment, this exerts a significant effect. This is because water-purifying treatment facilities are widely used in society at large. Therefore, there is a demand for such an ultraviolet irradiation water treatment apparatus that can be incorporated into the existing facilities and equipment. For example, in an ultraviolet irradiation water treatment apparatus including only one ultraviolet lamp, it is necessary to increase the total length of the apparatus. On the other hand, the ultraviolet irradiation water treatment apparatus 10 according to the first embodiment includes plural (six) ultraviolet lamps, so that the irradiation efficiency is increased several times (six times) for the same total length.

(Modification)

Figure 6:
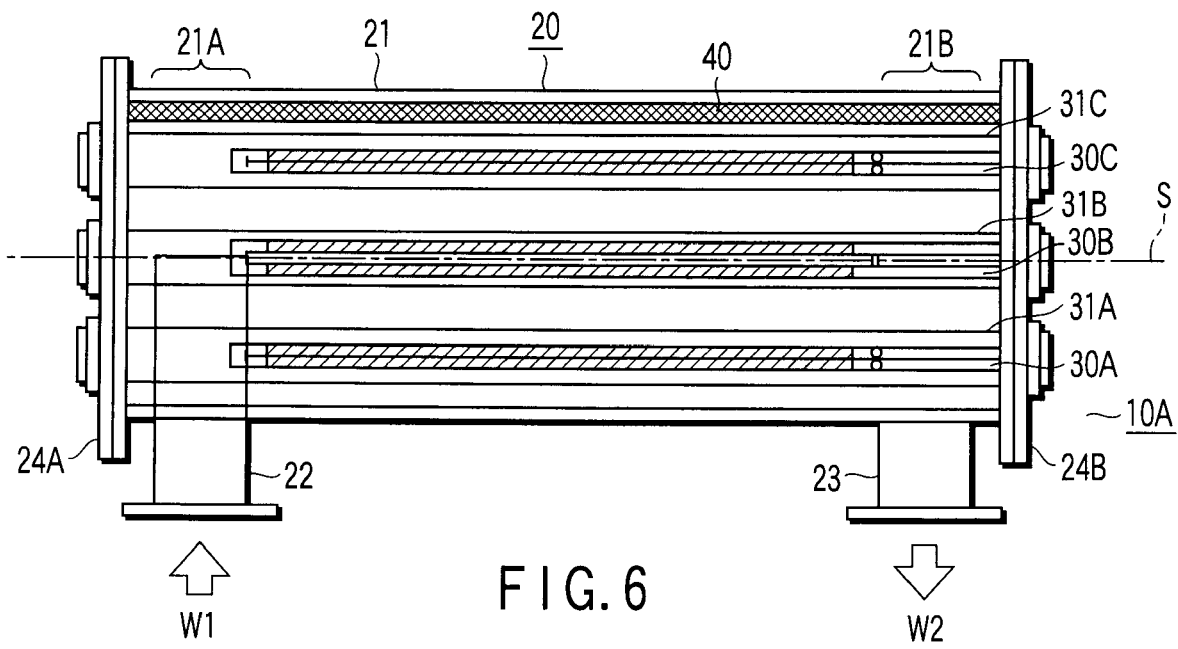
FIG. 6 is a side view showing an ultraviolet irradiation water treatment apparatus 10A according to the first embodiment.
Figure 7:
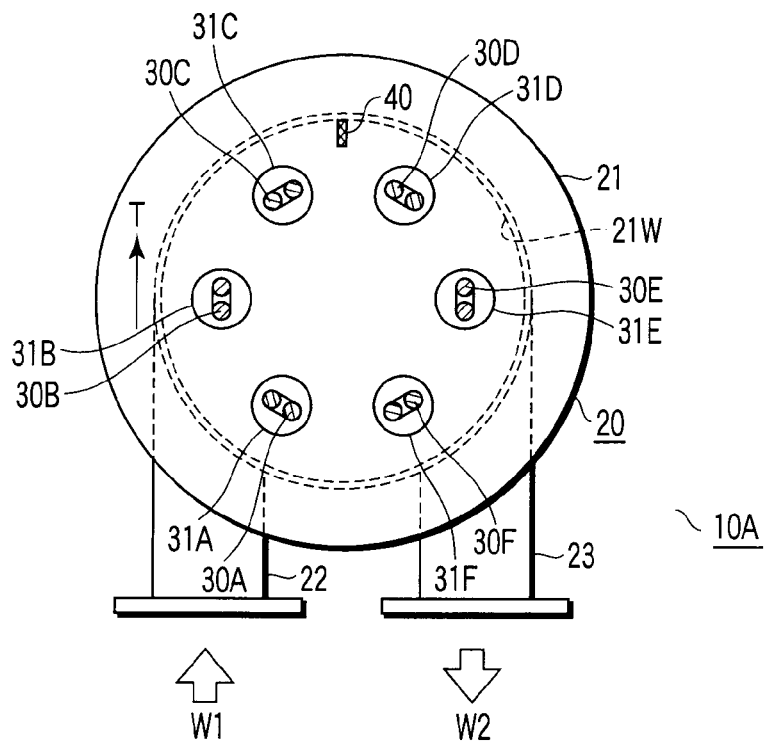
FIG. 7 is a plan view showing the ultraviolet irradiation water treatment apparatus 10A according to the first embodiment.

Sometimes the water W1 can be irradiated more effectively with an ultraviolet ray by providing a baffle 40 in the ultraviolet irradiation water treatment apparatus 10 according to the first embodiment. FIGS. 6 and 7 are a side view and a plan view showing an example of an ultraviolet irradiation water treatment apparatus 10A including the baffle 40.

An effect of providing the baffle 40 will be described below.

When the water W1 flowing from the water inlet pipe 22 has a high flow rate, because the transit time of the water W1 in the vessel 20 is decreased, sometimes a sufficient ultraviolet dose is not obtained. The baffle 40 is provided in the inner wall 21W of the side portion 21 such that a longitudinal direction of the baffle 40 runs parallel to the central axis S, whereby the swirling flow of the water W1 can be weakened. This enables the flow to be increased in the central portion of the vessel 20. Accordingly, the water W1 can sufficiently be irradiated with an ultraviolet ray.

The number of baffles 40 is not limited to one, and plural baffles 40 may be provided. However, the ultraviolet lamps 30A to 30F tend to make the flow smoother. Therefore, it is necessary that the number of baffles and a position, a size, and a shape of the baffle be determined in consideration of the flow rate of the water W1, and the diameter and position of the ultraviolet lamps, the diameter of the water inlet pipe 22, and the position of the water outlet pipe 23.

Second Embodiment

Figure 8:
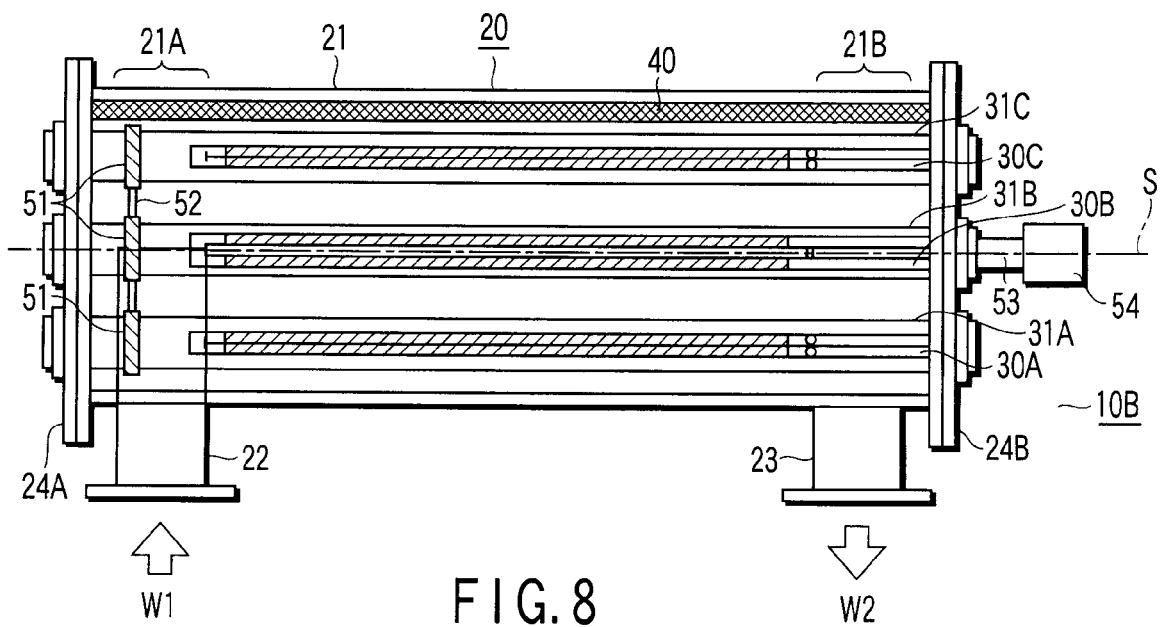
FIG. 8 is a side view showing an ultraviolet irradiation water treatment apparatus 10B according to a second embodiment of the invention.
Figure 9:
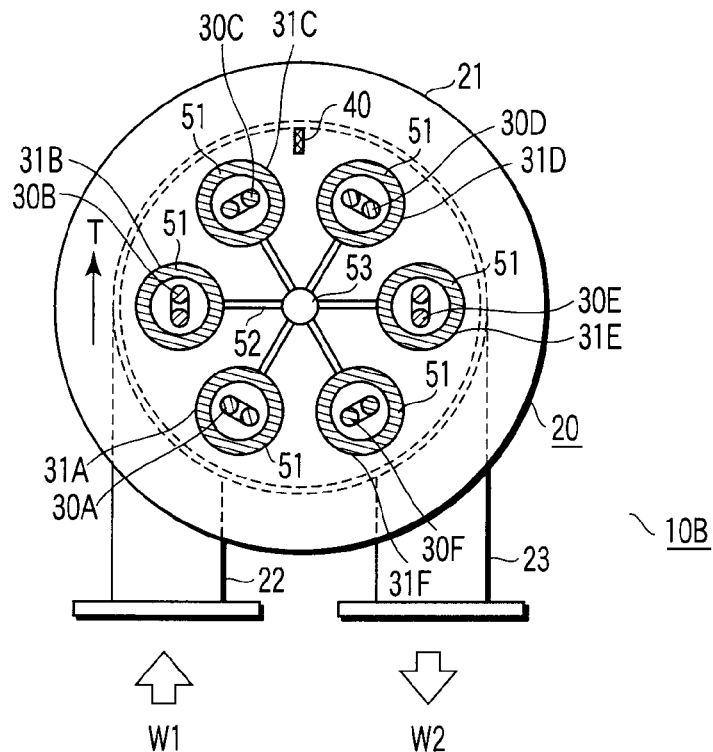
FIG. 9 is a plan view showing the ultraviolet irradiation water treatment apparatus 10B according to the second embodiment.

FIG. 8 is a side view showing a configuration of an ultraviolet irradiation water treatment apparatus 10B according to a second embodiment of the invention, and FIG. 9 is a plan view showing the ultraviolet irradiation water treatment apparatus 10B. The same components as the first embodiment are designated by the same numerals, and an overlapping description is omitted unless otherwise needed. In the following embodiments subsequent to the second embodiment, overlapping descriptions are also omitted.

In the ultraviolet irradiation water treatment apparatus 10B according to the second embodiment, a cleaning apparatus 50 is incorporated into the ultraviolet irradiation water treatment apparatus 10A according to the first embodiment.

The cleaning apparatus 50 includes a cleaning component 51, a moving component 52, a drive shaft 53, and drive motor 54.

The cleaning component 51 scrapes the protective tubes 31A to 31F to wash out stains. Specifically, a resin brush made of a fluorocarbon resin or the like which is not deteriorated by an ultraviolet ray, or a metal brush made of SUS can be used as the cleaning component 51. More preferably, a stainless steel brush is used.

A ring-shaped cleaning component may be used instead of the brush-shaped cleaning component 51. Specifically, an O-ring made of a fluorocarbon resin or the like can be used. When a brush is used as the cleaning component 51, bristles on the brush may break and sometimes fragments are mixed into the treated water W2. Therefore, it is necessary to perform membrane separation to remove the fragments in the next treatment process. On the other hand, when an O-ring is used as the cleaning component 51, the membrane separation process can be eliminated. Therefore, preferably an O-ring is used as the cleaning component 51 in the water-purifying treatment.

The moving component 52 fixes the cleaning component 51 to the drive shaft 53 to support the cleaning component 51, and the moving component 52 moves the cleaning component 51 along the drive shaft 53 according to rotation of the drive shaft 53. Specifically, the moving component 52 is attached to the cleaning component 51, and the moving component 52 is connected to the drive shaft 53 with an external and internal thread structure.

The drive shaft 53 is provided along the central axis S of the vessel 20, and the rotation of the drive shaft 53 drives the moving component 52 along the central axis S. That is, the drive shaft 53 is connected to the moving component 52 with the external and internal thread structure, whereby the rotational energy of the drive shaft 53 is converted into the drive energy of the moving component 52.

The drive motor 54 is used to rotate the drive shaft 53. The drive motor 54 can be drive-timed. For example, the drive motor 54 can be set by a built-in timer so as to be driven every 15 minutes.

As described above, the ultraviolet irradiation water treatment apparatus 10B includes the cleaning apparatus 50, so that disinfecting performance using ultraviolet irradiation can be maintained.

(Disinfecting Performance)

An action of the cleaning apparatus 50 will be described next.

The organic and inorganic matter dissolved in the water W1 attach to the surfaces of the protective tubes 31A to 31F. Particularly, for the inorganic matter such as calcium, solubility is lowered as water temperature increases. Therefore, when the protective tubes 31A to 31F are heated by heating the ultraviolet lamps 30A to 30F, calcium and the like are precipitated and attach to the surfaces of the protective tubes 31A to 31F. In this case, the calcium and the like attaching to the surfaces of the protective tubes 31A to 31F are called "stains".

The contaminated surfaces of the protective tubes 31A to 31F block the irradiation of the water W1 with the ultraviolet ray, thereby lowering the disinfecting performance of the ultraviolet irradiation water treatment apparatus 10B. In order to avoid the lowered disinfecting performance, it is necessary that the protective tubes 31A to 31F be cleaned several times a day.

Therefore, in the ultraviolet irradiation water treatment apparatus 10B according to the second embodiment, the protective tubes 31A to 31F are cleaned by physical cleaning in which the surface of the protective tube is scraped with a brush or cleaning ring. Therefore, because the surfaces of the protective tubes 31A to 31F are always cleaned, the disinfecting performance of the ultraviolet irradiation can be maintained. Chemical cleaning may also be used, which involves cleaning with chemicals.

The attachment (stain) removed by the cleaning is discharged along with the treated water W2. At this point, it is necessary that the concentration of the removed attachment in the treated water be lower than a certain water quality criterion. The requirement can be met by increasing the cleaning frequency.

Figure 10:
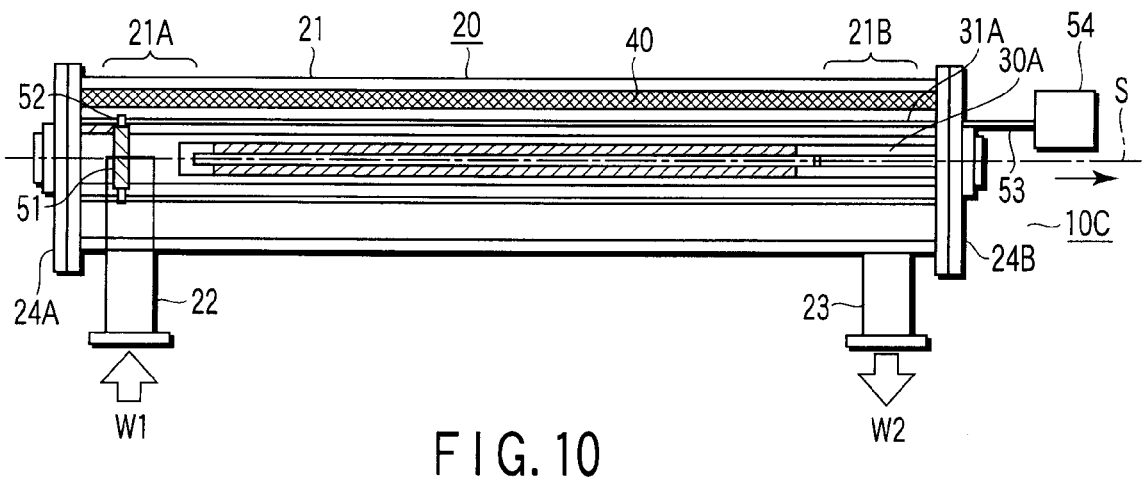
FIG. 10 is a side view showing an ultraviolet irradiation water treatment apparatus 10C according to the second embodiment.

The ultraviolet irradiation efficiency can also be increased in the absence of plural ultraviolet lamps in the ultraviolet irradiation water treatment apparatus 10B. Specifically, an ultraviolet irradiation water treatment apparatus 10C can be cited. FIGS. 10 and 11 are a side view and a plan view showing the ultraviolet irradiation water treatment apparatus 10C.

The ultraviolet irradiation water treatment apparatus 10C includes not plural ultraviolet lamps but only one ultraviolet lamp. Even though the ultraviolet irradiation water treatment apparatus 10C includes only one ultraviolet lamp, the water W1 can be caused to swirl to enhance the ultraviolet irradiation efficiency.

In the ultraviolet irradiation water treatment apparatus 10C, because the ultraviolet lamp is disposed on the central axis S of the vessel 20, the drive shaft 53 of the cleaning apparatus 50 is disposed apart from the central axis S. Therefore, the same action and effect as the installation of the baffle 40 can be obtained in the case where the drive shaft 53 is disposed apart from the central axis S.

Third Embodiment

Figure 12:
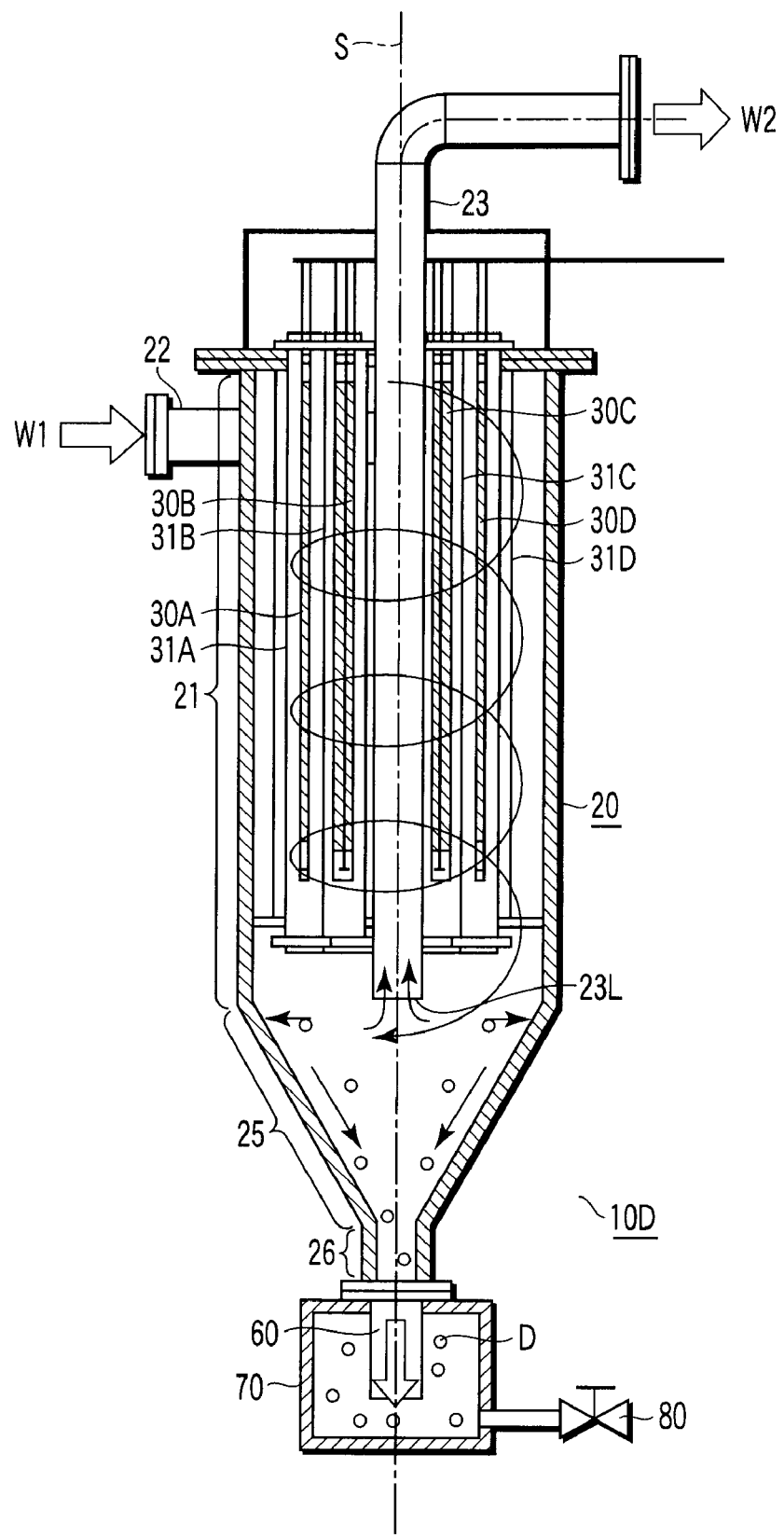
FIG. 12 is a side view showing an ultraviolet irradiation water treatment apparatus 10D according to a third embodiment of the invention.

FIG. 12 is a side view showing a configuration of an ultraviolet irradiation water treatment apparatus 10D according to a third embodiment of the invention.

In the ultraviolet irradiation water treatment apparatus 10D according to the third embodiment, the vessel of the ultraviolet irradiation water treatment apparatus 10 according to the first embodiment is modified to include a contaminant recovery mechanism. Specifically, the ultraviolet irradiation water treatment apparatus 10D further includes a connection pipe 60, a contaminant trap container 70, and contaminant recovery piping 80.

The vessel 20 of the ultraviolet irradiation water treatment apparatus 10D includes a reversely conical discharge portion 25 in the lower portion of the side portion 21 and a connection portion 26 below the discharge portion 25.

The water outlet pipe 23 is disposed along the central axis S. A lower end 23L of the water outlet pipe 23 is disposed below lower ends of the ultraviolet lamps 31A to 31F.

The connection pipe 60 is used to connect the connection portion 26 of the vessel 20 and the contaminant trap container 70.

The contaminant trap container 70 is connected to the vessel 20 through the connection pipe 60 to accumulate the discharged water W1 and a contaminant D contained in the water W1. The contaminant trap container 70 is disposed below the connection pipe 60. Therefore, the connection pipe 60 can be inserted in and connected to the contaminant trap container 70.

The contaminant recovery piping 80 is used to recover the contaminant D accumulated in the contaminant trap container 70. The contaminant D accumulated in the contaminant trap container 70 can be discharged by opening the contaminant recovery piping 80 on a recovery date and time.

An action of the ultraviolet irradiation water treatment apparatus 10D according to the third embodiment will be described below.

The water W1 flows into the vessel 20 through the water inlet pipe 22.

The water W1 flowing into the vessel 20 sequentially flows clockwise near the outer peripheries of the six ultraviolet lamps 30A to 30F arranged in the circumferential direction of the side portion 21.

Figure 13:
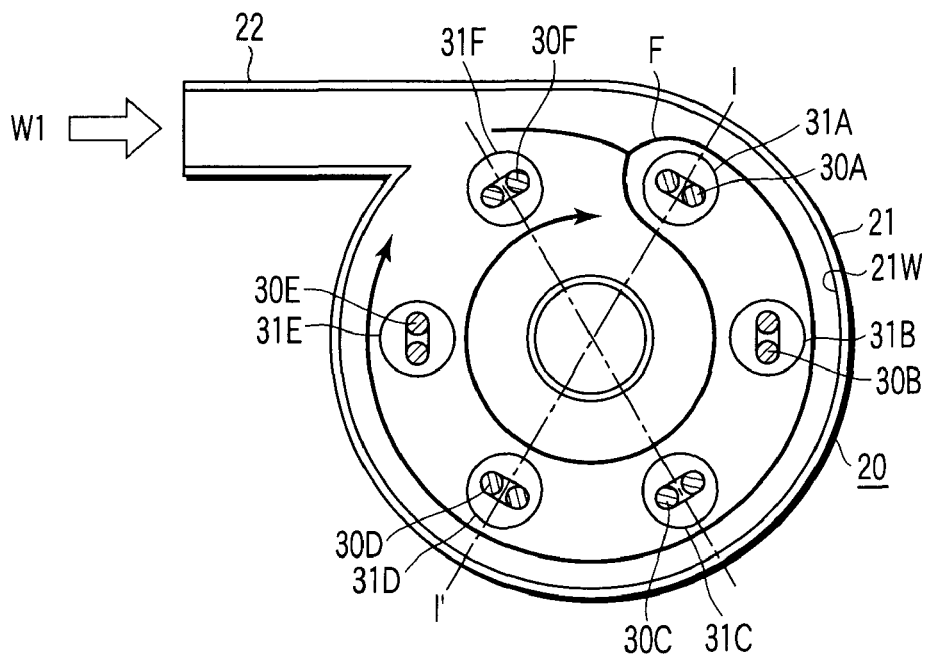
FIG. 13 is a view showing a flow F when water W1 according to the third embodiment swirls.
Figure 14:
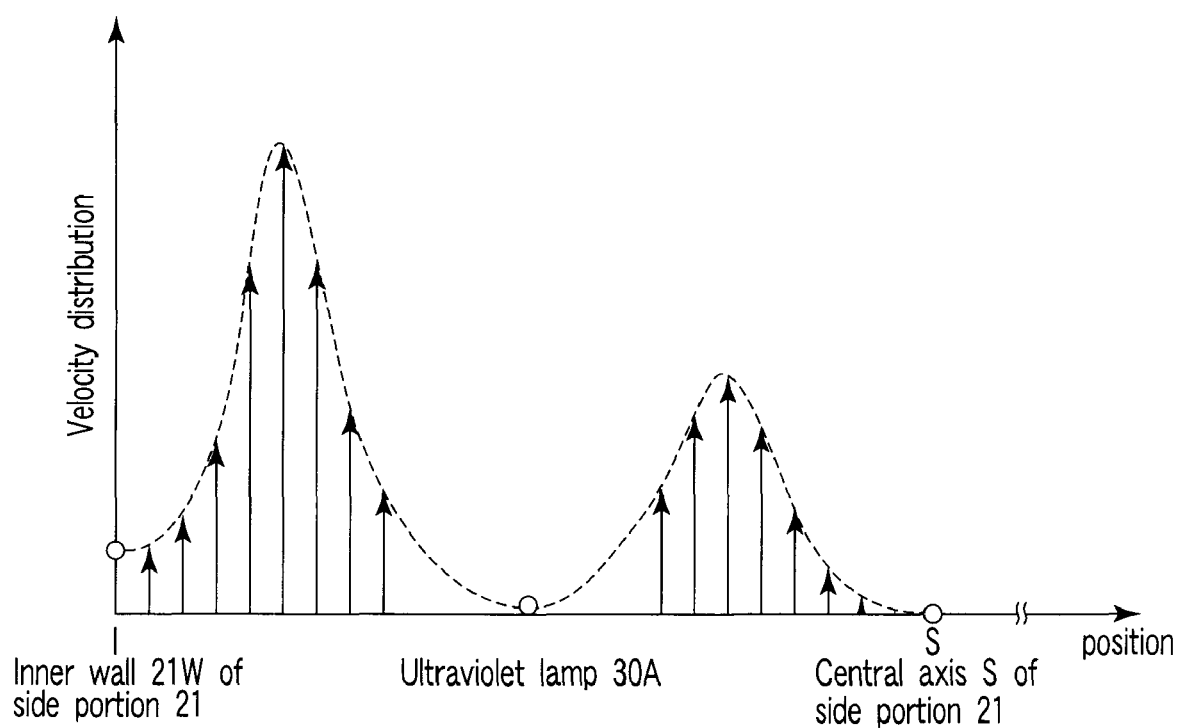
FIG. 14 is a view showing a concept of velocity distribution in a circumferential direction when the water W1 according to the third embodiment swirls.

The water W1 flows efficiently from the upper end to the lower end in the central axis direction of the vessel 20. That is, the water W1 flows downward along the central axis S while swirling spirally in the vessel 20. A flow F of the water W1 during the swirl is expressed, for example, as shown in FIG. 13. FIG. 13 is a sectional view showing the side portion 21 which is a cylindrical portion. FIG. 14 is a view showing a velocity distribution in a flow direction of the ultraviolet lamp 30A in a section taken on line 1-1' of FIG. 13.

As described above, usually the water W1 is irradiated with an ultraviolet ray while swirling in the vessel 20.

However, due to an accidental impact, sometimes the protective tubes 31A to 31F are broken and therefore the ultraviolet lamps 30A to 30F break.

In such cases, fragments of the quartz glass tube constituting the ultraviolet lamps 30A to 30F and protective tubes 31A to 31F are mixed into the water W1, or the mercury enclosed in the ultraviolet lamps 30A to 30F leaks into the water W1. The fragments of the quartz glass tube and the mercury become contaminant D of the water W1.

In comparison with water, which has a specific gravity of 1, the quartz glass tube has a specific gravity of 2.2 and mercury has specific gravity of 13.5. The swirl of the water containing the quartz glass tube and mercury pushes the substance having a larger specific gravity to the outside in the swirling direction by a centrifugal separation action. That is, a centrifugal force is applied to the water by the swirling flow, and heavy substances are separated from the fluid flowing in the vessel 20. The separated substances such as glass and mercury reach the inner wall 21W of the side portion 21, and the substances are collected downward along the inner wall 21W by gravitation.

That is, in the ultraviolet irradiation water treatment apparatus 10D according to the third embodiment, even if the contaminant D is thoroughly mixed with the water W1, the contaminant D can surely be guided to the contaminant trap container 70 by the centrifugal separation action caused by the spiral swirling flow of the water W1 and gravitation. Therefore, the treated water W2 in which the contaminant D is mixed can be prevented from flowing out.

Thus, in the ultraviolet irradiation water treatment apparatus 10D according to the third embodiment, the whole body of the water W1 can efficiently be irradiated with an ultraviolet ray.

Even if an ultraviolet lamp is broken due to an accidental impact, the contaminant is not mixed into the treated water W2, due to a centrifugal separation action, so that ultraviolet irradiation can be performed safely and surely.

In the event that a part of the ultraviolet lamps 30A to 30F is broken or turned off, because the water W1 flows near all the ultraviolet lamps 30A to 30F, the water W1 can continuously be irradiated with an ultraviolet ray without interrupting the running of the apparatus.

Because the water-purifying facilities always run as a social infrastructure, the water W1 always flows into the ultraviolet irradiation water treatment apparatus. In the case where the water W1 always flows into the ultraviolet irradiation water treatment apparatus, an ultraviolet lamp and protective tube may break due to the water-hammer action if the contaminant recovery piping 80 is carelessly opened. The ultraviolet irradiation water treatment apparatus 10D according to the third embodiment comprises the contaminant trap container 70 in which the contaminant D can be tentatively accumulated, so that any breakage of the ultraviolet lamp and protective tube due to water-hammer action can be contained.

Figure 15A:
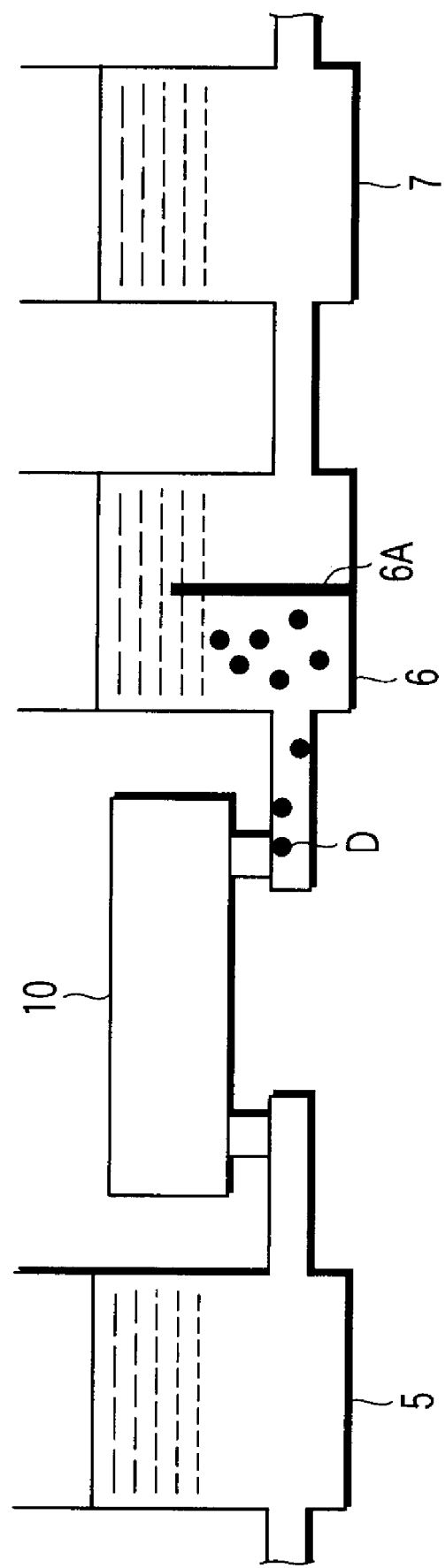
FIG. 15A is a view for explaining an effect of a contaminant trap container 70 according to the third embodiment.
Figure 15B:
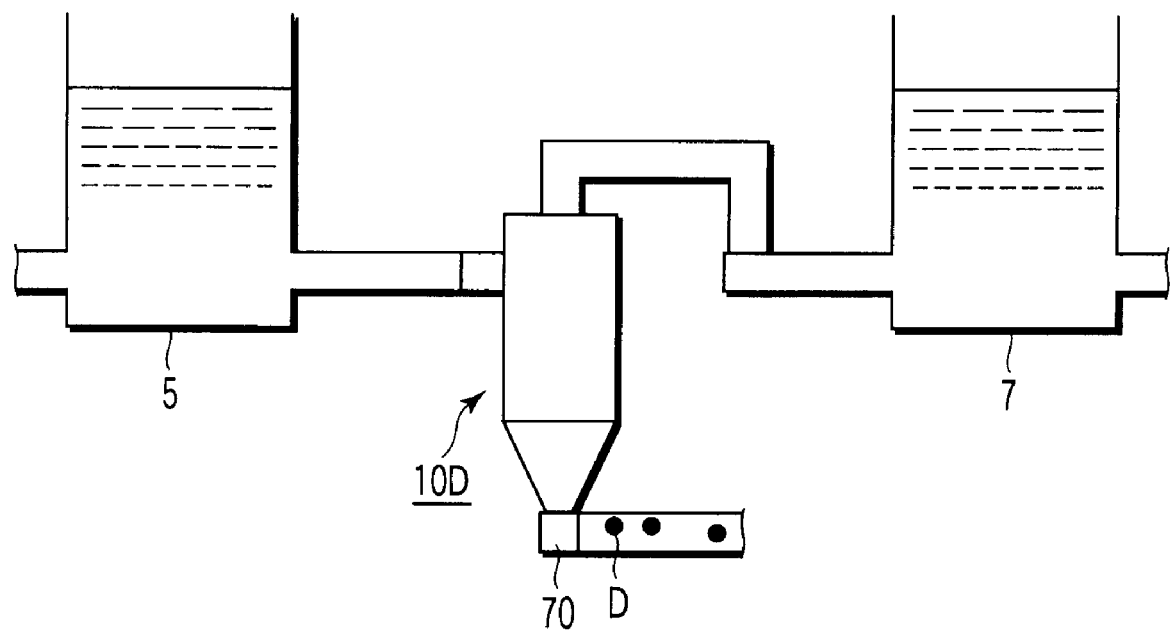
FIG. 15B is a view for explaining an effect of the contaminant trap container 70 according to the third embodiment.

In the ultraviolet irradiation water treatment apparatus 10D according to the third embodiment, because the need for installing a recovery pond to recover the contaminant is eliminated, the structure of the water-purifying facilities and the like can be simplified. That is, in the ultraviolet irradiation water treatment apparatus 10 according to the first embodiment, as shown in FIG. 15(A), a recovery pond 6 is required to recover the contaminant D between a catchment well 5 and an aggregation and sedimentation pond 7. The recovery pond 6 includes a partition plate 6A, and the contaminant D, which does not pass over the partition plate 6A, collects at the bottom of the recovery pond 6. On the other hand, as shown in FIG. 15(B), since the ultraviolet irradiation water treatment apparatus 10D according to the third embodiment includes the contaminant trap container 70 in which the contaminant D can be tentatively accumulated, the need for installing a recovery pond 6 can be eliminated.

Fourth Embodiment

Figure 16:
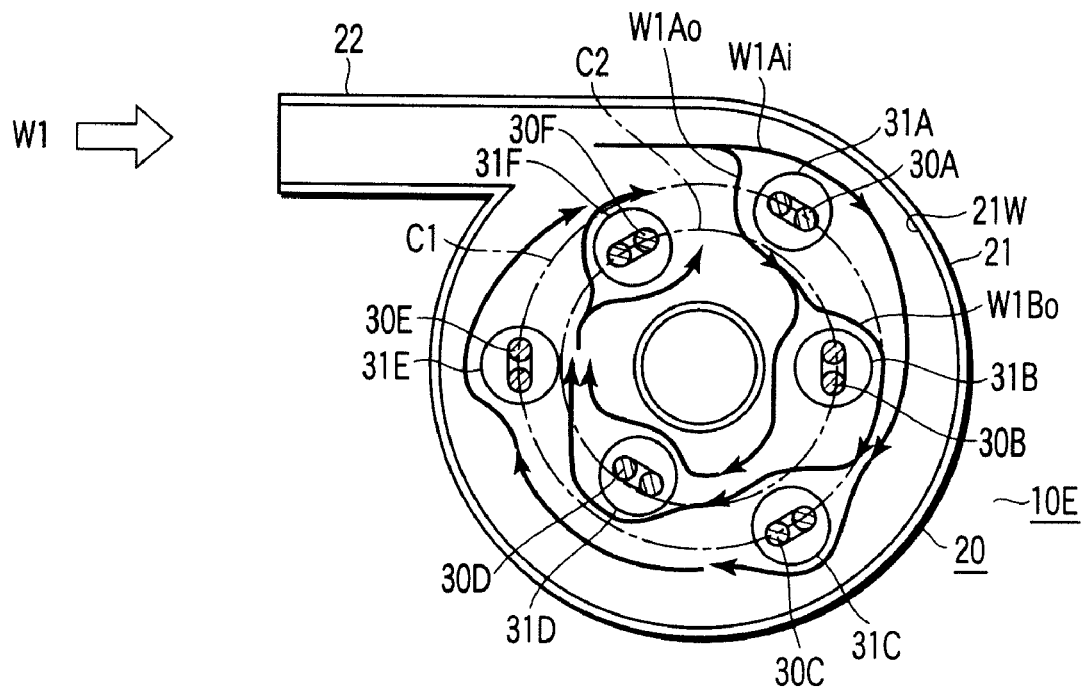
FIG. 16 is a schematic view showing installation sites of ultraviolet lamps 30A and 30F of an ultraviolet irradiation water treatment apparatus 10E according to a fourth embodiment of the invention.

FIG. 16 is a schematic view showing installation sites of ultraviolet lamps 30A and 30F of an ultraviolet irradiation water treatment apparatus 10E according to a fourth embodiment of the invention.

The ultraviolet irradiation water treatment apparatus 10E according to the fourth embodiment differs from the first embodiment and second embodiment in the installation sites of the ultraviolet lamps 30A to 30F and protective tubes 31A to 31F.

In the fourth embodiment, a first inner periphery C1 is set around the central axis S and a second inner periphery C2 is set inside the first inner periphery C1 in the vessel 20, the first ultraviolet lamps 31A, 31C, and 31E are disposed at equal intervals on the first inner periphery C1, and the second ultraviolet lamps 31B, 31D, and 31F are disposed at equal intervals on the second inner periphery C2. The second ultraviolet lamps 31B, 31D, and 31F are disposed in a certain angular configuration at midpoints between the first ultraviolet lamps 31A, 31C, and 31E respectively.

In other words, three ultraviolet lamps 30A, 30C, and 30E are arranged at equal circumferential angles of 120° as an outer peripheral array. The remaining three ultraviolet lamps 30B, 30D, and 30F are arranged at equal intervals as an inner peripheral array on an inner periphery of a smaller array radius than that of the outer peripheral array, and circumferential angles of the ultraviolet lamps 30B, 30D, and 30F are shifted by 60°.

FIG. 16 shows an array method when the six ultraviolet lamps 30A to 30F are arranged. However the invention is not limited to the array method of FIG. 16.

An action of the ultraviolet irradiation water treatment apparatus 10E according to the fourth embodiment will be described below.

The water W1 flows into the vessel 20 through the water inlet pipe 22.

The water W1 flowing into the vessel 20 flows downward along the central axis S while swirling in the vessel 20. At this point, the water W1 impinges on the first ultraviolet lamp 30A in the outer peripheral array, and the water W1 passes through the ultraviolet lamp 30A while divided onto the side of the inner wall 21W and onto the side of the inner periphery C2.

Then, water W1Ao flowing onto the side of the inner periphery C2 of the ultraviolet lamp 30A impinges on the first ultraviolet lamp 30B in the inner peripheral array. Then, the water W1Ao passes through the ultraviolet lamp 30B while divided onto the side of the outer periphery C1 and onto the side of the central axis S.

Then, water W1Bo flowing onto the side of the outer periphery C1 of the ultraviolet lamp 30B and water W1Ai flowing onto the side of the inner wall 21W of the first ultraviolet lamp 30A in the outer peripheral array merge to impinge on the second ultraviolet lamp 30C in the outer peripheral array.

Then, similarly, the water W1 sequentially flows around the second ultraviolet lamp 30D in the inner peripheral array, the third ultraviolet lamp 30E in the outer peripheral array, the third ultraviolet lamp 30F in the inner peripheral array, and so on.

Thus, in the ultraviolet irradiation water treatment apparatus 10E according to the fourth embodiment, the ultraviolet lamps are arrayed in the first inner periphery C1 and the second inner periphery C2 respectively. Therefore, a retention region where the flow stops between the ultraviolet lamps is not formed, which enables the water W1 to flow securely.

Figure 17:
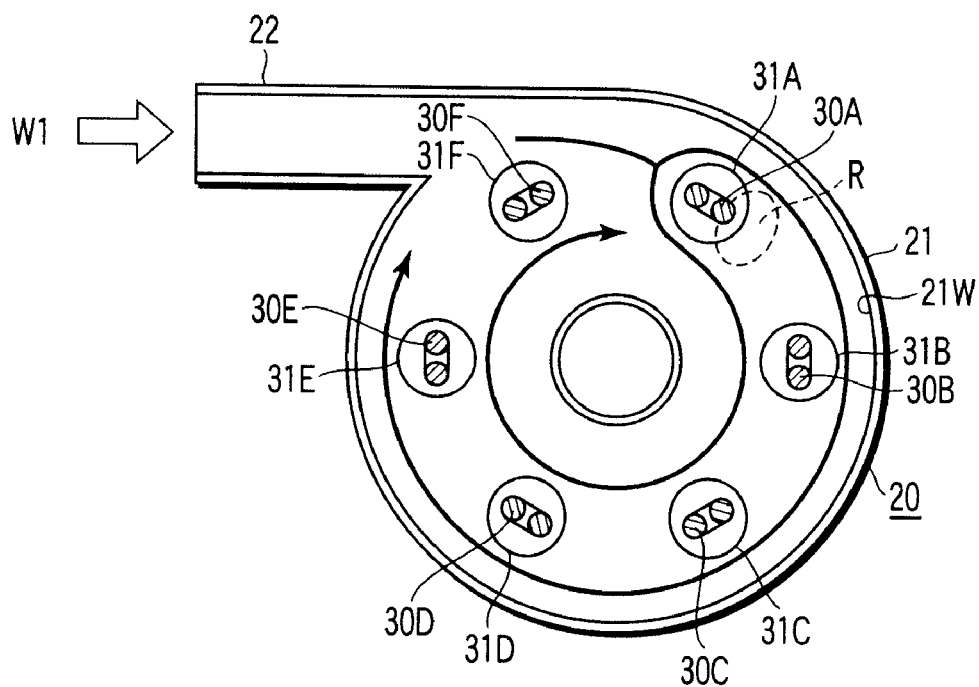
FIG. 17 is a view showing a comparative example of the installation sites of the ultraviolet lamps 30A and 30F according to the fourth embodiment.

That is, a retention region where the flow stops between the ultraviolet lamps is formed in the case where all the ultraviolet lamps 30A to 30F are arrayed on the same radius. For example, in FIG. 17, a retention region R is formed at the back of the ultraviolet lamp 30A along the swirling direction of the water W1. If a retention region is formed, the whole body of the water cannot be evenly irradiated with an ultraviolet ray. In the ultraviolet irradiation water treatment apparatus 10E according to the fourth embodiment, compared with the ultraviolet irradiation water treatment apparatus in which the ultraviolet irradiation lamps are arranged on the same circumference, the whole body of the water can be evenly irradiated with an ultraviolet ray to enhance the ultraviolet irradiation efficiency.

In the event that a part of the ultraviolet lamps 30A to 30F is broken or turned off, because the water W1 flows near all the ultraviolet lamps 30A to 30F, the ultraviolet irradiation treatment can continuously be performed without interrupting the running of the apparatus.

Fifth Embodiment

Figure 18:
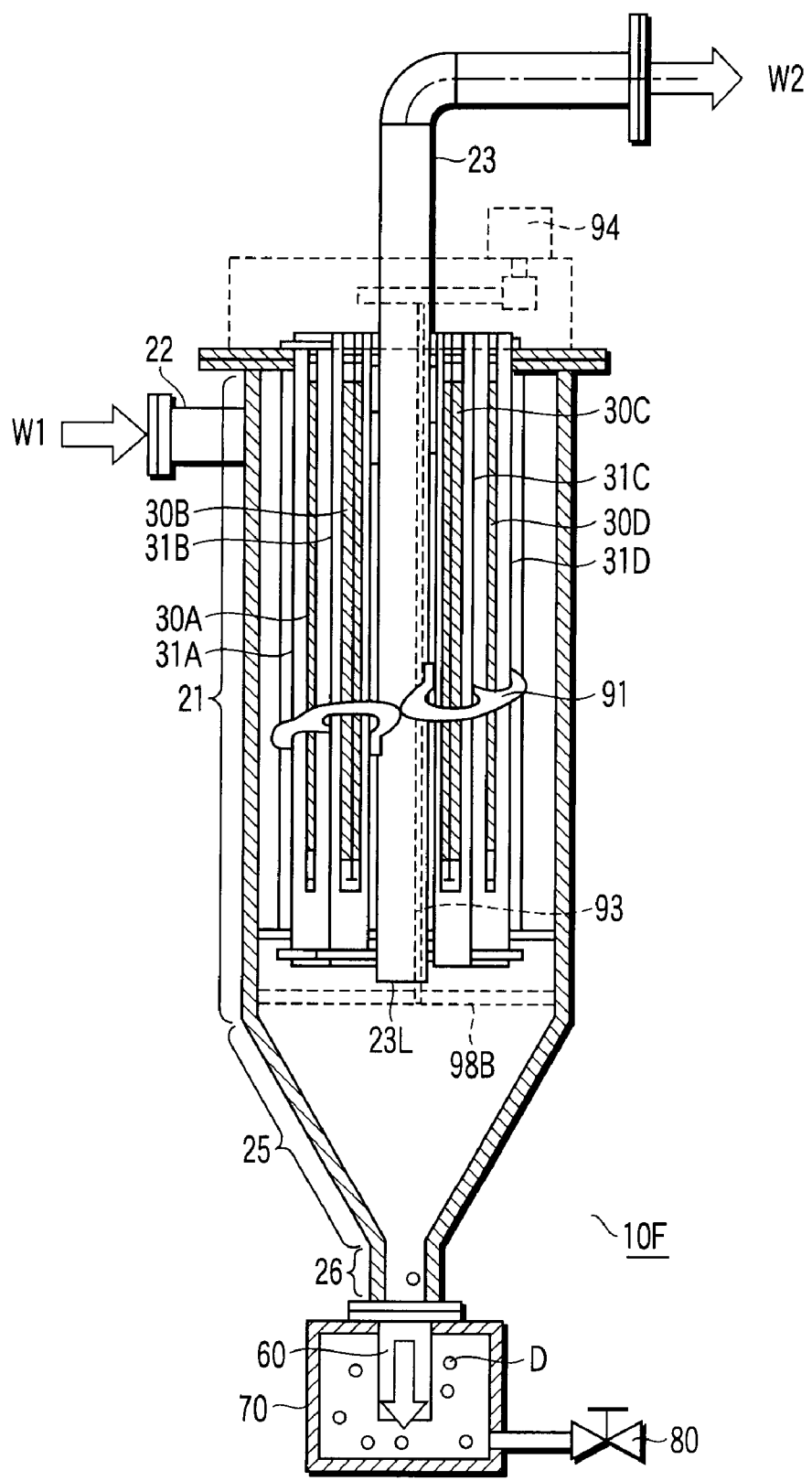
FIG. 18 is a schematic view showing a configuration of an ultraviolet irradiation water treatment apparatus 10F according to a fifth embodiment of the invention.
Figure 19:
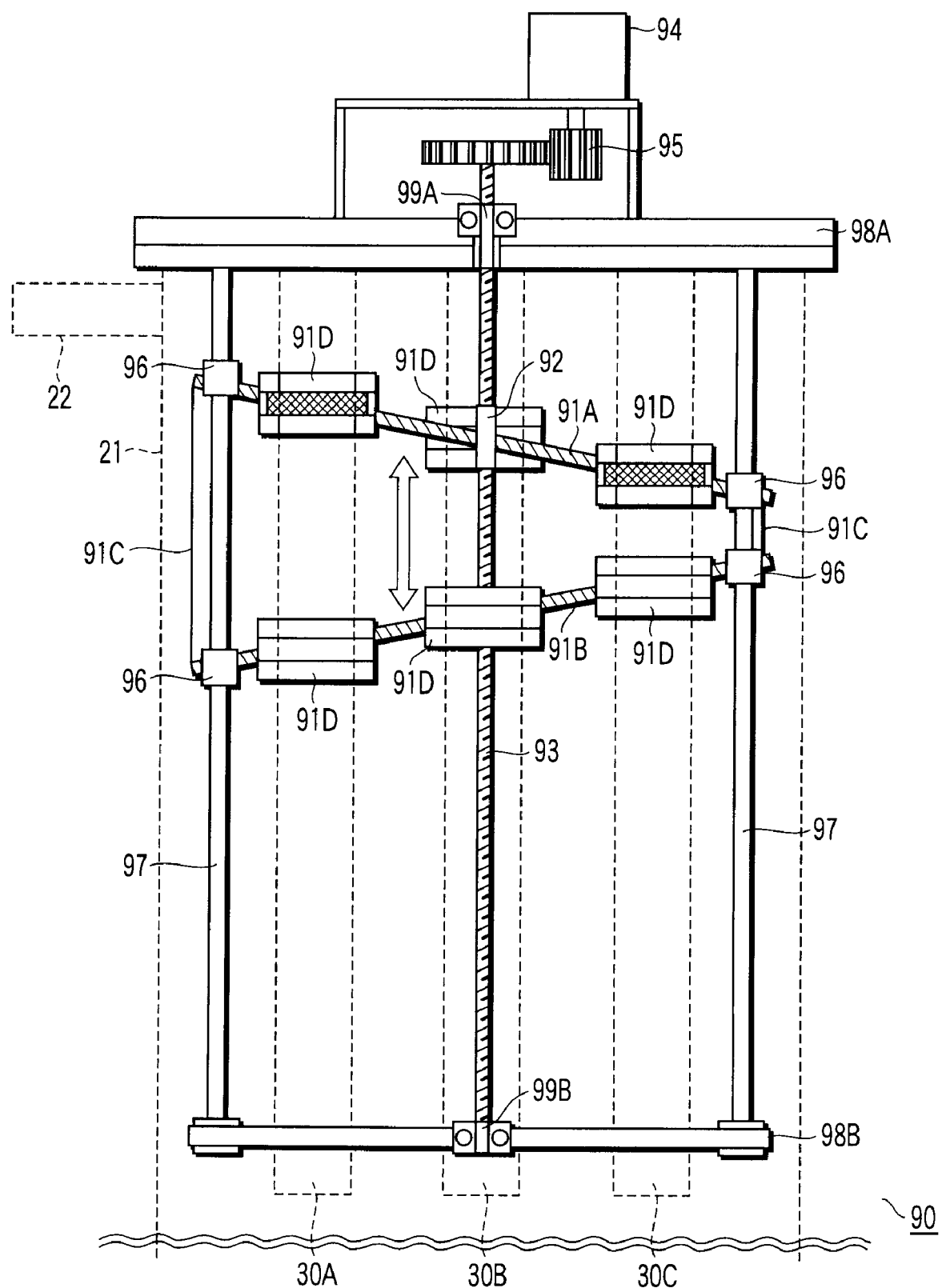
FIG. 19 is a schematic view showing a configuration of a cleaning apparatus 90 according to the fifth embodiment.

FIG. 18 is a schematic view showing a configuration of an ultraviolet irradiation water treatment apparatus 10F according to a fifth embodiment of the invention. FIG. 19 is a schematic view showing a configuration of a cleaning apparatus 90 of the fifth embodiment.

In the ultraviolet irradiation water treatment apparatus 10F according to the fifth embodiment, a cleaning apparatus 90 is incorporated into the ultraviolet irradiation water treatment apparatus 10D according to the third embodiment.

The cleaning apparatus 90 includes a cleaning component 91, a moving component 92, a drive shaft 93, a drive motor 94, and a gear-change mechanism 95.

The cleaning component 91 scrapes the protective tubes 31A to 31F to wash out a stain. As shown in FIG. 20, the cleaning component 91 includes a first guide vane type cleaning plate 91A, a second guide vane type cleaning plate 91B, and a coupling component 91C.

The first guide vane type cleaning plate 91A is a semicircular cleaning plate which is obliquely disposed such that the downstream side of the swirling flow of the water W1 is located below the upstream side of the swirling flow. The first guide vane type cleaning plate 91A includes three cleaning wipers 91D to clean the protective tubes 31A to 31C.

The second guide vane type cleaning plate 91B is a semicircular cleaning plate which is coupled to the first guide vane type cleaning plate 91A to form a circular shape and obliquely disposed to cause the water W1 to further swirl. The second guide vane type cleaning plate 91B is coupled so as to be located below the first guide vane type cleaning plate 91A. The second guide vane type cleaning plate 91B includes three cleaning wipers 91D to clean the protective tubes 31D to 31F.

The coupling component 91C is used to couple the first guide vane type cleaning plate 91A and the second guide vane type cleaning plate 91B.

The moving component 92 fixes the cleaning component 91 to the drive shaft 93 to support the cleaning component 91, and the moving component 92 moves the cleaning component 91 along the drive shaft 93 according to the rotation of the drive shaft 93. The moving component 92 is attached to the first guide vane type cleaning plate 91A. The moving component 92 and the drive shaft 93 are connected to each other with an external and internal thread structure.

The drive shaft 93 is provided along the central axis S of the vessel 20, and the rotation of the drive shaft 93 drives the moving component 92 along the central axis S. Specifically, the thread is processed over the drive region of the drive shaft 93, whereby the rotation of the drive shaft 93 vertically lifts the moving component 92 having the threaded inner surface. In other words, the drive shaft 93 and the moving component 92 are connected with the external and internal thread structure so that the rotational energy of the drive shaft 93 can be converted into the lifting energy of the moving component 92.

The drive motor 94 is used to rotate the drive shaft 93. The drive motor 94 can be drive-timed. For example, the drive motor 94 can be set by a built-in timer so as to be driven every 15 minutes.

The gear-change mechanism 95 is used to change the rotation speed of the drive motor 94.

In addition, the cleaning apparatus 90 includes a guide component 96, a guide rail 97, fixing plates 98A and 98B, and bearings 99A and 98B other than the components in the above described configuration. The guide component 96 is used to latch the first guide vane type cleaning plate 91A and second guide vane type cleaning plate 91B in the guide rail 97. The bearings 99A and 99B fix the guide rail 97 respectively to the fixing plates 98A and 98B provided in the upper and lower portions of the drive region.

An action of the ultraviolet irradiation water treatment apparatus 10F according to the fifth embodiment will be described below.

The drive motor 94 is driven to rotate the drive shaft 93 on a previously set date and time or as needed.

Then, the moving component 92 moves up and down along the central axis S of the vessel 20 according to the rotation of the drive shaft 93. The moving component 92 is attached to the first guide vane type cleaning plate 91A, and the first guide vane type cleaning plate 91A and the second guide vane type cleaning plate 91B are coupled by the coupling component 91C. Therefore, the rotation of the drive shaft 93 vertically moves the whole cleaning component 91.

When the cleaning component 91 is vertically moved, the cleaning wipers 91D are moved while vertically scraping the surfaces of the protective tubes 31A to 31F. Therefore, the surfaces of the protective tubes 31A to 31F are cleaned.

Thus, in the ultraviolet irradiation water treatment apparatus 10F according to the fifth embodiment, because the cleaning wipers 91D are moved while vertically scraping the surfaces of the protective tubes 31A to 31F, stains can be prevented from adhering to the surface of the protective tube. Examples of the components of stains of the protective tubes 31A to 31F include organic matter in the water and inorganic matter such as iron, manganese, and calcium.

The cleaning component 91 according to the fifth embodiment includes the first guide vane type cleaning plate 91A and the second guide vane type cleaning plate 91B. The first guide vane type cleaning plate 91A and the second guide vane type cleaning plate 91B are obliquely disposed in the swirling direction of the swirling flow.

Therefore, in the upper portion of the side portion 21 of the ultraviolet irradiation water treatment apparatus 10F, the guide vane type cleaning plates 91A and 91B are inclined along the line of flow of the spiral swirling flow, so that an increase in flow resistance can be suppressed.

On the other hand, in the lower portion of the ultraviolet irradiation water treatment apparatus 10F, sometimes the swirling force of the water W1 is weakened by the flow resistance in the upper portion to strengthen the flow rate in the axial direction. In such cases, the guide vane type cleaning plates 91A and 91B can act as a guide vane to restore the swirling flow.

That is, in the ultraviolet irradiation water treatment apparatus 10F, the cleaning apparatus 90 includes the guide vane type cleaning plates 91A and 91B, so that an increase in flow resistance can be suppressed in the region where the swirling flow becomes dominant while the swirling flow can be restored in the region where the flow rate in the axial direction becomes dominant. Additionally, stains can be prevented from adhering to the surface of the protective tube. Therefore, effective ultraviolet irradiation can continuously be performed.

Sixth Embodiment

FIG. 21 is a side view showing a configuration of an ultraviolet irradiation water treatment apparatus 10G according to a sixth embodiment of the invention, and FIG. 22 is a plan view showing the ultraviolet irradiation water treatment apparatus 10G.

In the ultraviolet irradiation water treatment apparatus 10G, the water W1 is caused to flow in, the water W1 is irradiated with the ultraviolet ray, and the treated water W2 is caused to flow out.

The ultraviolet lamps 30A to 30F and the protective tubes 31A to 31F are disposed in the vessel 20 of the ultraviolet irradiation water treatment apparatus 10G. The contaminant trap container 70 and the contaminant recovery piping 80 are disposed below the vessel 20.

The vessel 20 of the ultraviolet irradiation water treatment apparatus 10G includes the side portion 21, the water inlet pipe 22, the water outlet pipe 23, the discharge portion 25, the connection portion 26, and a lid 27.

The side portion 21 includes a cylindrical outer wall and a cylindrical inner wall, and the water inlet pipe 22 is attached to the side portion 21 while a part of the outer wall and the inner wall are communicated such that water W1 flows in the tangential direction of the inner periphery.

The water inlet pipe 22 is provided in the tangential direction T of the inner periphery of the side portion 21 to cause the water W1 to flow in.

The water outlet pipe 23 is provided in the vessel 20 to cause the treated water W2 to flow out. The water outlet pipe 23 is disposed on the central axis S of the side portion 21 while piercing through the lid 27.

The discharge portion 25 is provided at a lower end of the side portion 21, and the discharge portion 25 is formed in a reversely truncated conical shape and has a decreased inner diameter at the lower end of the side portion 21.

The connection portion 26 is connected to the contaminant trap container 70. The connection portion 26 is provided at the lower end of the discharge portion 25, and the connection portion 26 is formed in a cylindrical shape having the same inner diameter as that at the lower end of the discharge portion 25.

The lid 27 is a cover which covers the upper end of the side portion 21 in a watertight manner. The ultraviolet lamps 30A to 30F and the protective tubes 31A to 31F are disposed in the back surface of the lid 27.

The ultraviolet lamps 30A to 30F are disposed in parallel with the central axis S of the side portion 21. The ultraviolet lamps 30A to 30F are disposed in the lid 27, and the ultraviolet lamps 30A to 30F are provided at equal intervals on the circumference around the central axis S. Specifically, a quartz tube rod in which the electrodes are attached to both ends is formed in a U-shape and used as the ultraviolet lamp.

The protective tubes 31A to 31F are made of quartz glass such that the water W1 does not directly contact the ultraviolet lamps 30A to 30F. In this case, the protective tubes 31A to 31F are separately disposed so as to surround each of the ultraviolet lamps 30A to 30F.

The guide plate 41 is attached to a region where an angle formed between the inner wall of the side portion 21 and the inner wall of the water inlet pipe 22 is an acute angle. Specifically, the guide plate 41 is attached such that the interval with the inner wall is gradually increased from the inner peripheral line of the side portion 21.

The contaminant trap container 70 accumulates the water W1 and the contaminant D contained in the water W1. Specifically, the contaminant trap container 70 is disposed below the vessel 20, and the connection portion 26 is inserted into the contaminant trap container 70. The contaminant trap container 70 accumulates the contaminant D which is contained in the water W1 discharged from the connection portion 26.

The contaminant recovery piping 80 is used to recover the contaminant D accumulated in the contaminant trap container 70. The contaminant D accumulated in the contaminant trap container 70 can be discharged by opening the contaminant recovery piping 80 on a recovery date and time.

An action of the ultraviolet irradiation water treatment apparatus 10G according to the sixth embodiment will be described below.

The water W1 flows into the vessel 20 through the water inlet pipe 22. At this point, the water W1 is guided toward the inner wall direction of the vessel 20 by the guide plate 41.

The water W1 flowing into the vessel 20 sequentially flows clockwise near the outer peripheries of the six ultraviolet lamps 30A to 30F arrayed in the circumferential direction of the side portion 21. The water W1 flows from the upper end to the lower end in the direction of the central axis S of the vessel 20. That is, the water W1 flows downward along the central axis S while swirling spirally in the vessel 20. The flow F of the water W1 during the swirl is expressed as shown in FIG. 22.

The swirling flow reaching the lower end of the discharge portion 25 becomes an upward flow to rise along the central axis S, and the upward flow is discharged from the water outlet pipe 23.

Thus, in the ultraviolet irradiation water treatment apparatus 10G according to the sixth embodiment, the water inlet pipe 22 is attached while a part of the outer wall and the inner wall are communicated such that the water W1 flows in along the tangential direction T of the inner wall of the side portion 21, so that the water W1 can swirl. Accordingly, the water W1 can flow while effectively contacting the ultraviolet lamps 30A to 30F, and the ultraviolet irradiation efficiency can be increased.

Because the ultraviolet irradiation water treatment apparatus 10G includes the guide plate 41, the water W1 can be guided toward the inner wall direction of the side portion 21, which allows the direction of inflow dynamic pressure of the water W1 to be converted into the swirling direction. Accordingly, a shearing force generated by the inflow dynamic pressure can be relaxed for the ultraviolet lamps 30A and 30F disposed near the entrance of the water inlet pipe 22, and breakage of the ultraviolet lamp 30 and protective tube 31 can be prevented.

The ultraviolet irradiation water treatment apparatus 10G includes the vessel 20 having the reversely truncated conical discharge portion 25 and the contaminant trap container 70. Therefore, even if the contaminant D is mixed into the water W1, the contaminant D can surely be guided to the contaminant trap container 70 by the centrifugal separation action caused by the spiral swirling flow of the water W1 and gravity, and the treated water W2 in which the contaminant D is mixed can be prevented from flowing out.

Seventh Embodiment

Figure 23:
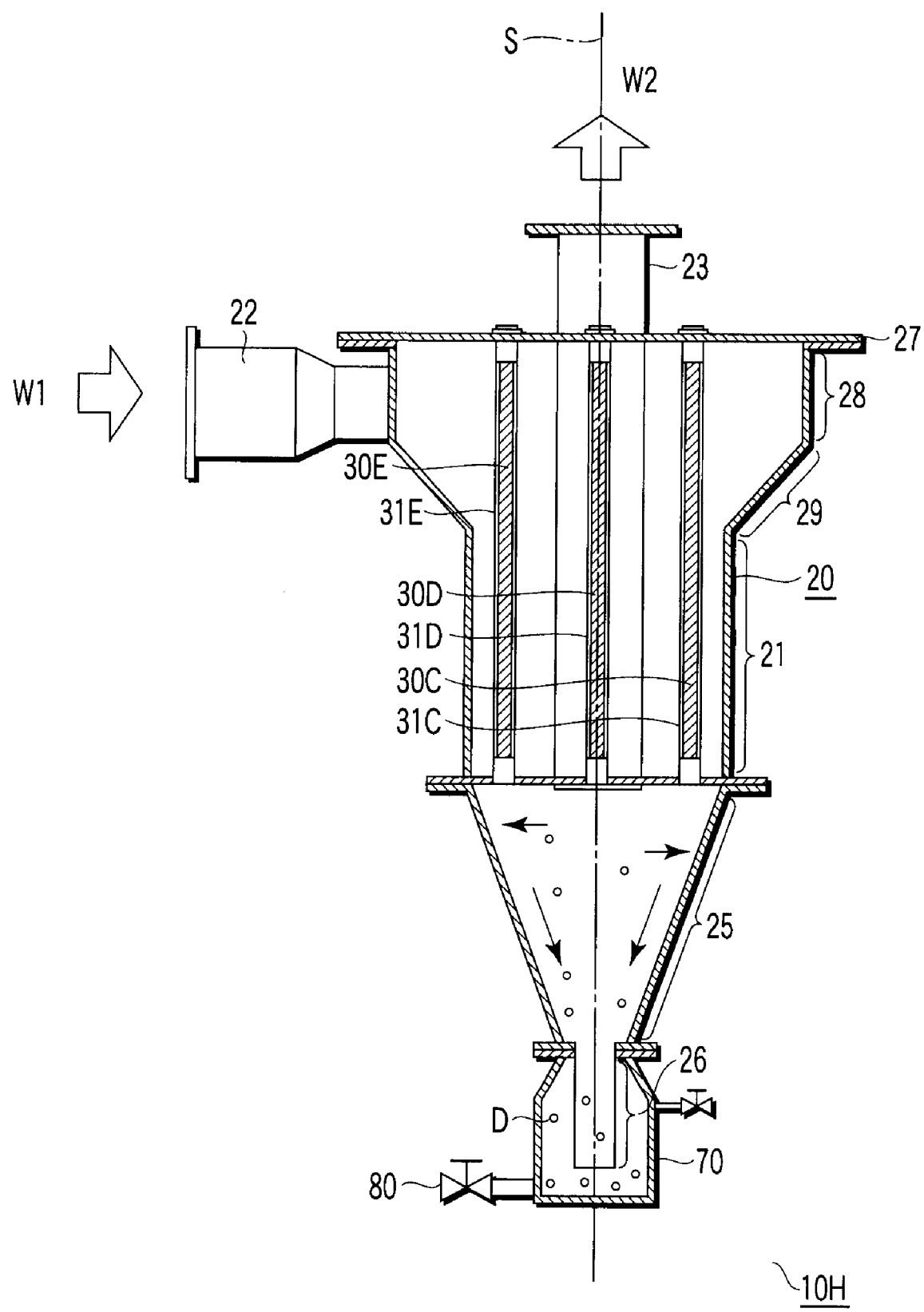
FIG. 23 is a side view showing a configuration of an ultraviolet irradiation water treatment apparatus 10H according to a seventh embodiment of the invention.

FIG. 23 is a side view showing a configuration of an ultraviolet irradiation water treatment apparatus 10H according to a seventh embodiment of the invention, and FIG. 24 is a plan view showing the ultraviolet irradiation water treatment apparatus 10H.

In the ultraviolet irradiation water treatment apparatus 10H according to the seventh embodiment, the vessel of the ultraviolet irradiation water treatment apparatus 10D according to the third embodiment is modified. Specifically, the vessel 20 includes an inflow portion 28 and a tapered portion 29. The water inlet pipe 22 is attached not to the side portion 21 but to the inflow portion 28.

The inflow portion 28 includes a cylindrical outer wall and a cylindrical inner wall, and the water inlet pipe 22 is attached to the inflow portion 28 while a part of outer wall and the inner wall are communicated such that the water W1 flows in the tangential direction T of the inner wall.

The tapered portion 29 having the reversely truncated conical shape is provided at the lower end of the inflow portion 28. In the tapered portion 29, the diameter of the inflow portion 28 is gradually decreased to the diameter of the side portion 21. That is, the inner diameter at the upper end of the tapered portion 29 is equal to the inner diameter of the inflow portion 28 and the inner diameter at the lower end is equal to the inner diameter of the side portion 21.

An action of the ultraviolet irradiation water treatment apparatus 10H according to the seventh embodiment will be described below.

The water W1 flows into the vessel 20 through the water inlet pipe 22. At this point, because there is no ultraviolet lamp 30A in the inflow direction of the water W1, a swirling flow is effectively generated while the flow of the water W1 is not blocked by the ultraviolet lamp 30A.

The water W1 of the swirling flow swirls in the tapered portion 29 while being brought close to the ultraviolet lamps 30A to 30F. Then, the water W1 flows to the lower end of the discharge portion 25 while swirling near the outer peripheries of the ultraviolet lamps 30A to 30F in the side portion 21.

The swirling flow reaching the lower end of the discharge portion 25 becomes the upward flow, the upward flow rises along the central axis S, and the upward flow is discharged from the water outlet pipe 23.

Thus, the ultraviolet irradiation water treatment apparatus 10H according to the seventh embodiment includes the inflow portion 28 whose inner diameter is larger than the inner diameter of the side portion 21, so that the contact between the water W1 and the ultraviolet lamp 30A can be reduced immediately after the water W1 flows in the inflow portion 28. Because there is no ultraviolet lamp 30A in the inflow direction of the water W1, the swirling flow is effectively generated while the flow of the water W1 is not blocked by the ultraviolet lamp 30A.

The distance between the ultraviolet lamp 30 and the swirling flow is gradually decreased in the tapered portion 29, and the water W1 swirls near the ultraviolet lamp 30 in the side portion 21. Therefore, the ultraviolet irradiation effect can be enhanced.

Because the contact between the water W1 and the ultraviolet lamp 30A is reduced immediately after the water W1 flows in the inflow portion 28, the shearing force generated by the inflow dynamic pressure can be relaxed for the ultraviolet lamp 30A and protective tube 31A near the entrance of the water inlet pipe 22.

Eighth Embodiment

FIG. 25 is a side view showing a configuration of an ultraviolet irradiation water treatment apparatus 10I according to an eighth embodiment of the invention, and FIG. 26 is a plan view showing the ultraviolet irradiation water treatment apparatus 10I.

In the ultraviolet irradiation water treatment apparatus 10I according to the eighth embodiment, cover components 32A to 32F are added to the ultraviolet irradiation water treatment apparatus 10H according to the seventh embodiment.

The cover components 32A to 32F are used to protect the protective tubes 31A to 31F in the inflow portion 28 respectively, and the cover components 32A to 32F are made of a metal such as iron or stainless steel. The cover components 32A to 32F are disposed in the vessel side of the lid 27.

As described above, the ultraviolet irradiation water treatment apparatus 10I includes the cover components 32A to 32F disposed in the outer peripheries of the protective tubes 31A to 31F, so that the direct action of the inflow dynamic pressure of the water W1 on the protective tubes 31A to 31F can be relaxed. That is, because the inflow dynamic pressure of the water W1 indicates a high value immediately after the water W1 flows in the inflow portion 28, sometimes it is necessary for the ultraviolet lamps 30A to 30F in the inflow portion 28 to be firmly protected rather than the protective tubes 31A to 31F made of quartz glass. In such cases, breakage of the ultraviolet lamps 30A to 30F and protective tubes 31A to 31F can be prevented by including the cover components 32A to 32F made of metal.

Ninth Embodiment

Figure 27:
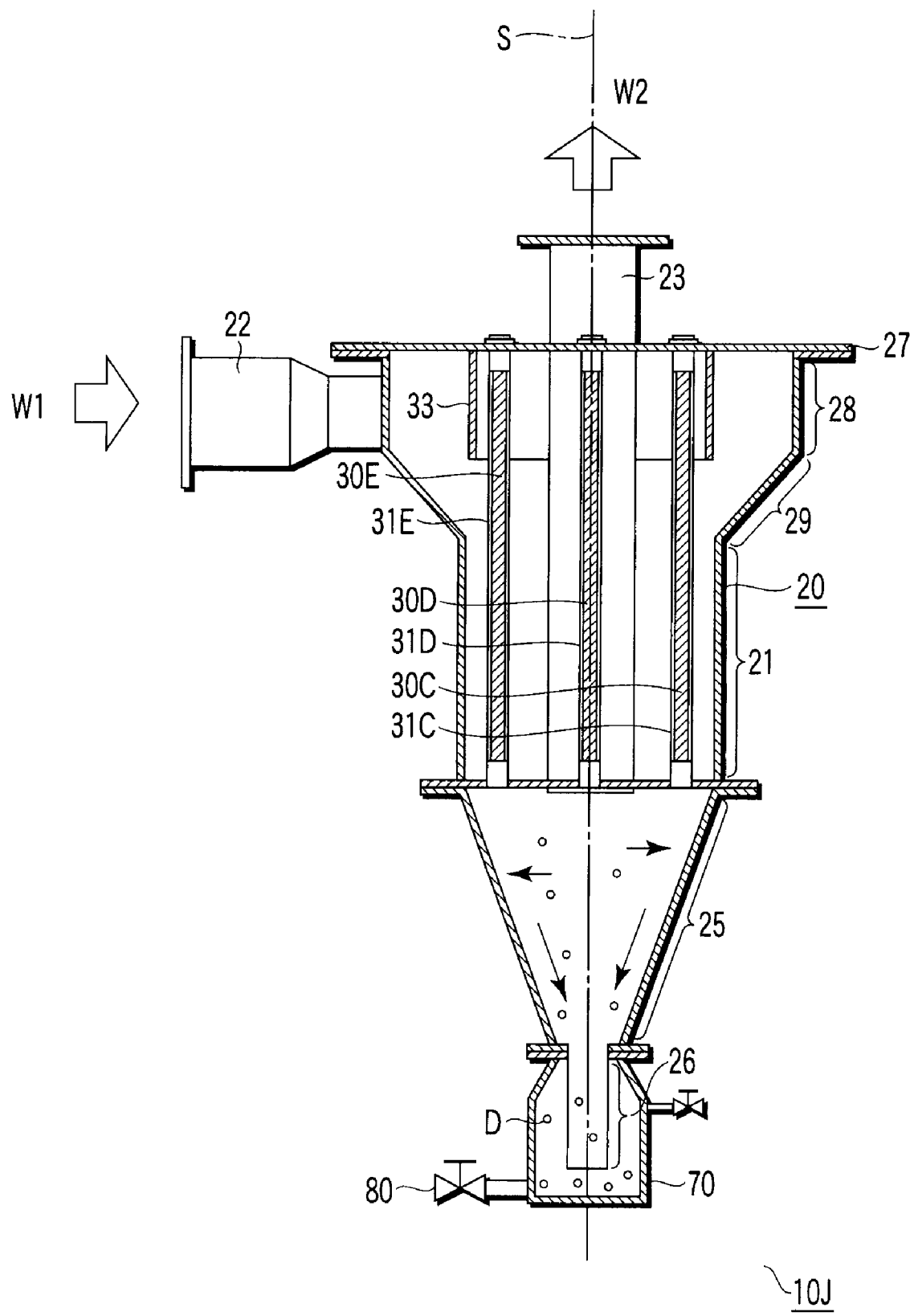
FIG. 27 is a side view showing a configuration of an ultraviolet irradiation water treatment apparatus 10J according to a ninth embodiment of the invention.
Figure 28:
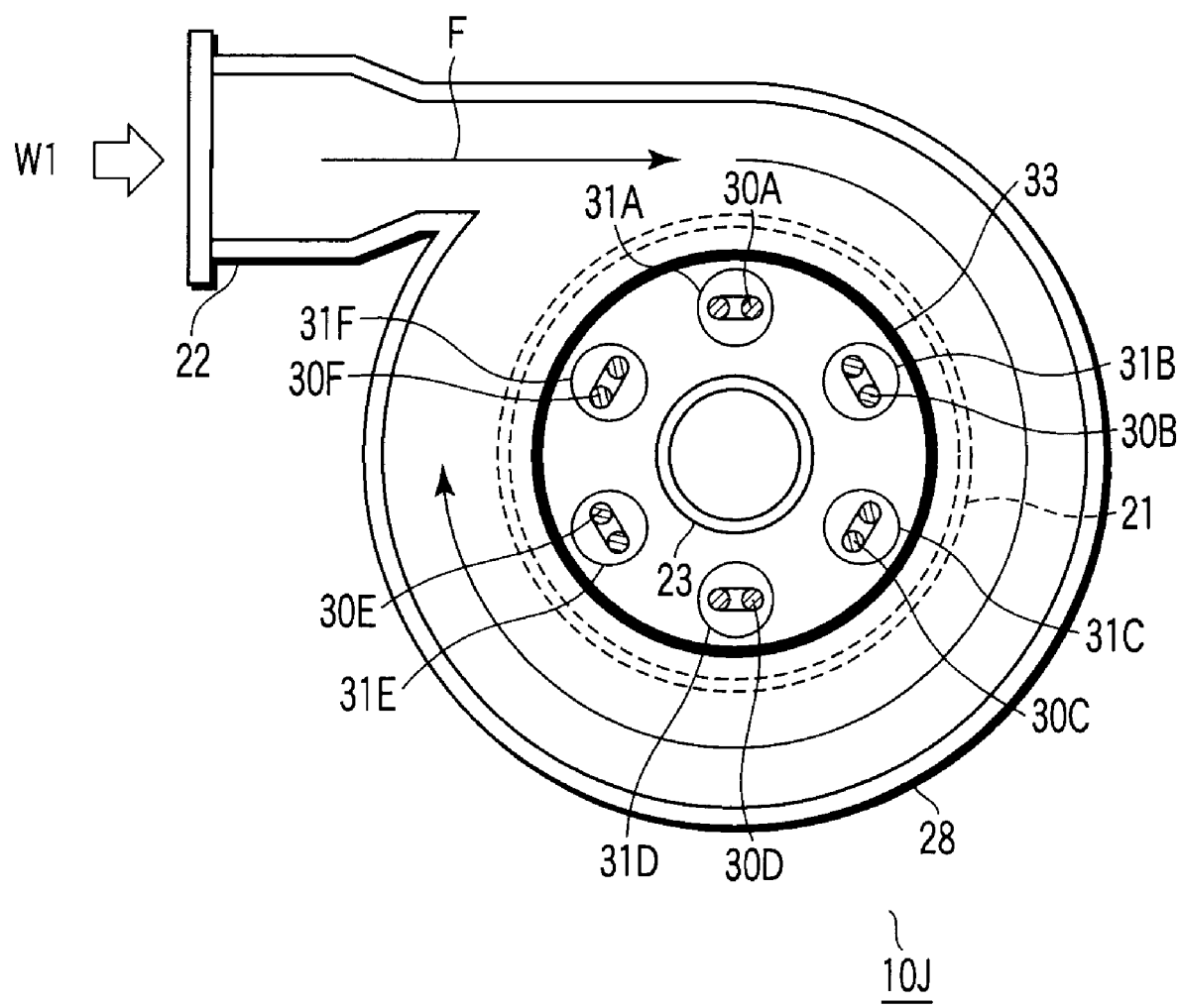
FIG. 28 is a plan view showing the ultraviolet irradiation water treatment apparatus 10J according to the ninth embodiment.

FIG. 27 is a side view showing a configuration of an ultraviolet irradiation water treatment apparatus 10J according to a ninth embodiment of the invention, and FIG. 28 is a plan view showing the ultraviolet irradiation water treatment apparatus 10J.

In the ultraviolet irradiation water treatment apparatus 10J according to the ninth embodiment, a cover skirt 33 is added to the ultraviolet irradiation water treatment apparatus 10H according to the seventh embodiment.

The cover skirt 33 is a cylindrical component which is disposed below the lid 27 so as to surround all the protective tubes 31A to 31F in the inflow portion 28. The cover skirt 33 is made of a metal such as iron, aluminum, or stainless steel.

Therefore, similarly to the ultraviolet irradiation water treatment apparatus 10I according to the eighth embodiment, breakage of the ultraviolet lamps 30A to 30F and protective tubes 31A to 31F can be prevented.

Additionally, a ring-shape flow path is formed by the outer peripheral surface of the cover skirt 33 and the inner wall of the inflow portion 28. Therefore, compared with the ultraviolet irradiation water treatment apparatus 10I in which the cover components 32A to 32F are separately attached to the protective tubes 31A to 31F, the water W1 can be guided toward the inner wall direction of the inflow portion 28, and the swirling flow can efficiently be generated.

Tenth Embodiment

Figure 29:
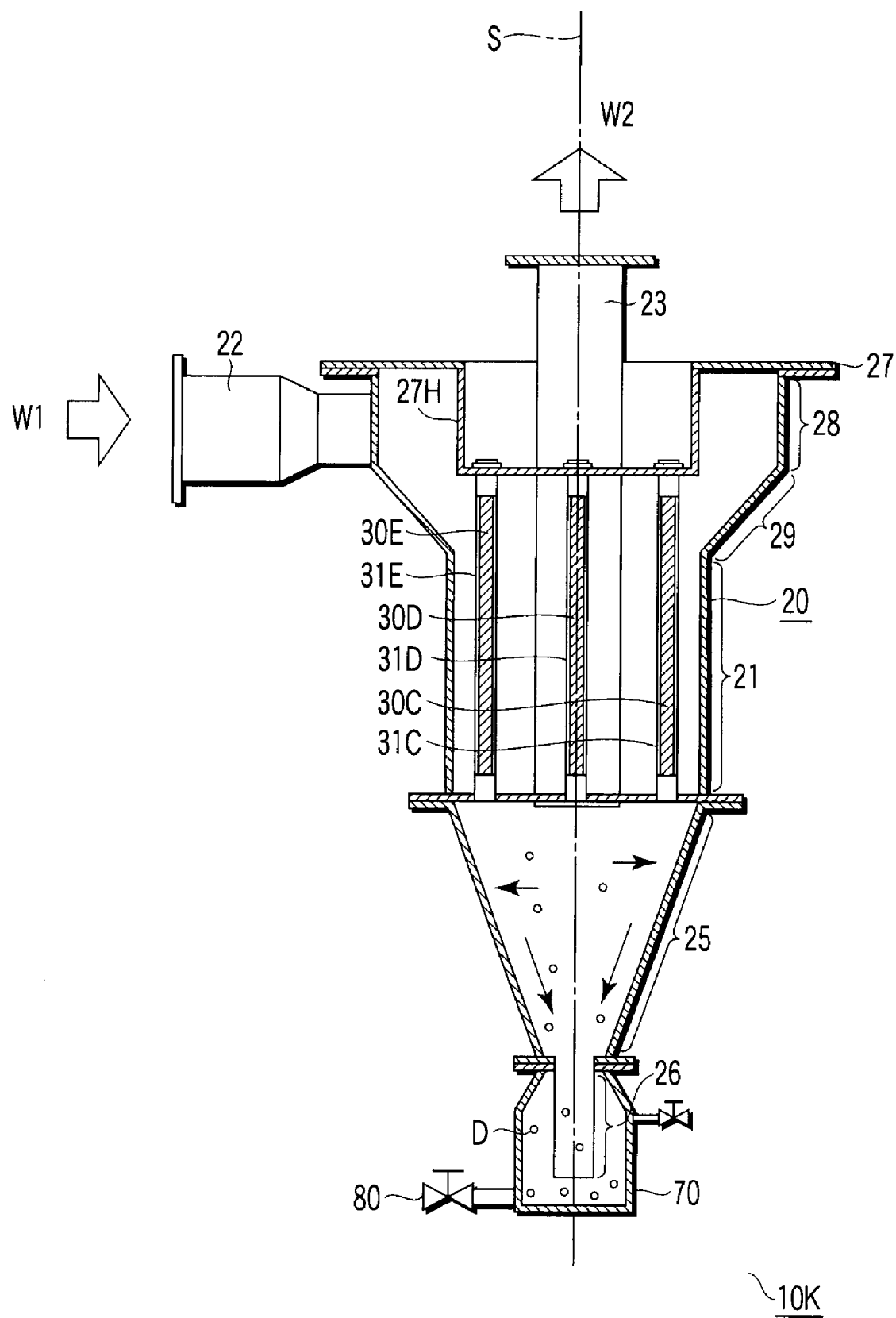
FIG. 29 is a side view showing a configuration of an ultraviolet irradiation water treatment apparatus 10K according to a tenth embodiment of the invention.
Figure 30:
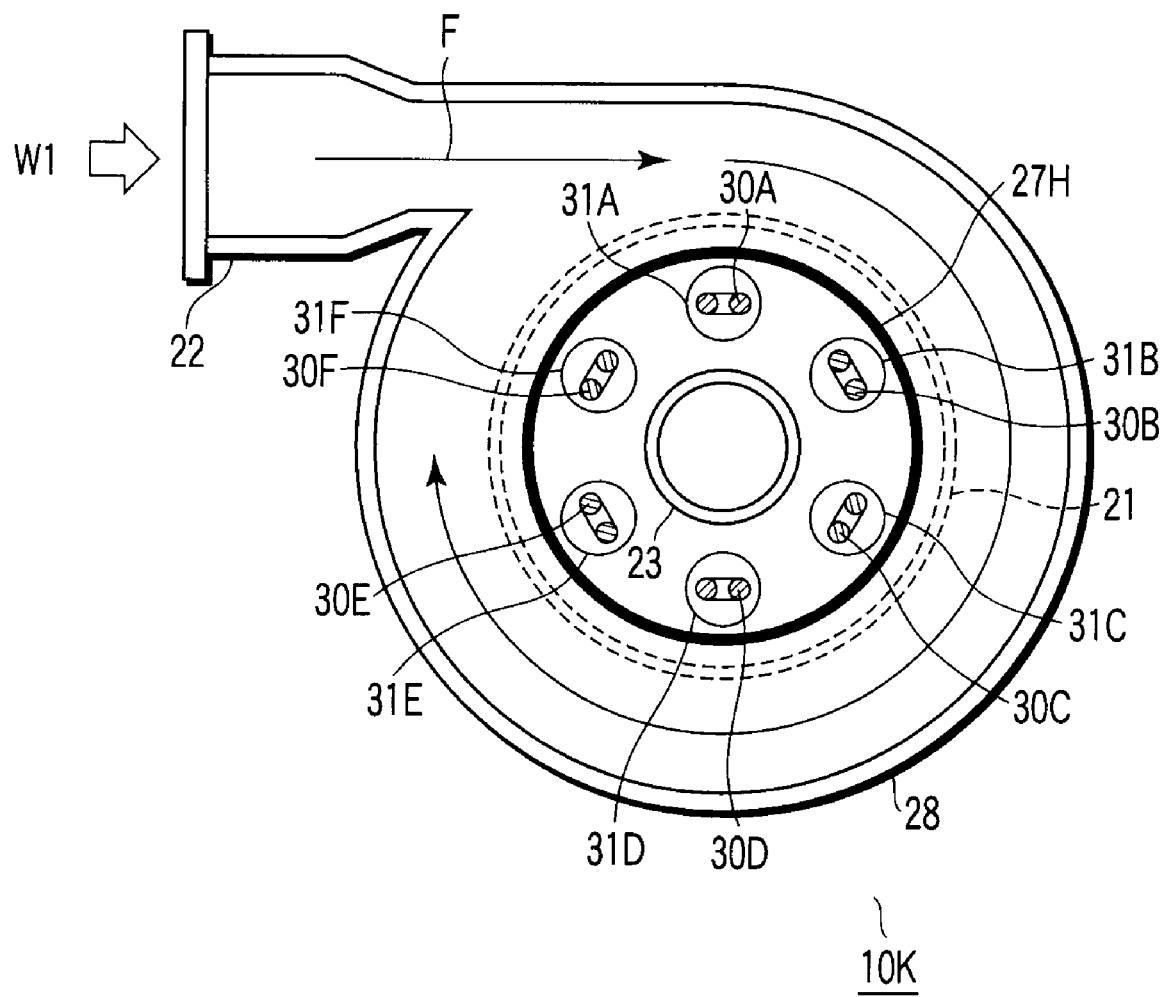
FIG. 30 is a plan view showing the ultraviolet irradiation water treatment apparatus 10K according to the tenth embodiment.

FIG. 29 is a side view showing a configuration of an ultraviolet irradiation water treatment apparatus 10K according to a tenth embodiment of the invention, and FIG. 30 is a plan view showing the ultraviolet irradiation water treatment apparatus 10K.

In the ultraviolet irradiation water treatment apparatus 10K according to the tenth embodiment, a recess portion 27H is added to the lid 27 of the ultraviolet irradiation water treatment apparatus 10H according to the seventh embodiment. The recess portion 27H recessed in a cylindrical shape so as to push down all the whole ultraviolet lamps 30A to 30F. In this case, the recess portion 27H pushes down the lid 27 by a height of the inflow portion 28.

In the ultraviolet irradiation water treatment apparatus 10K according to the tenth embodiment having the above-described configuration, the heights of the ultraviolet lamps 30A to 30F can be decreased compared with the ultraviolet irradiation water treatment apparatus 10J according to the ninth embodiment. Similarly to the ultraviolet irradiation water treatment apparatus 10J according to the ninth embodiment, the ring-shape flow path is formed by the outer peripheral surface of the recess portion 27H and the inner wall of the inflow portion 28, so that the swirling flow can efficiently be generated.

A terminal box is disposed in the recess portion 27H to accommodate connection terminals of electric wires through which electric power is supplied to the ultraviolet lamps 30A to 30F, whereby the height of the whole of the apparatus can be decreased. As described in the first embodiment, the decrease in height of the apparatus is a necessary factor in introducing the ultraviolet irradiation water treatment apparatus to existing water-purifying facilities.

The irradiation efficiency of the ultraviolet lamps 30A to 30F can also be increased. More specifically, due to the presence of the emission portions of the ultraviolet lamps 30A to 30F from the tapered portion 29 to the side portion 21, the treated fluid W1 flows closer to the ultraviolet lamp compared with the case of the inflow portion 28. Accordingly, the treated fluid W1 is irradiated with a strong ultraviolet ray to enhance the irradiation efficiency.

Eleventh Embodiment

FIG. 31 is a side view showing a configuration of an ultraviolet irradiation water treatment apparatus 10L according to an eleventh embodiment of the invention, and FIG. 32 is a plan view showing the ultraviolet irradiation water treatment apparatus 10L.

In the ultraviolet irradiation water treatment apparatus 10L according to the eleventh embodiment, a first guide fin 42 and a second guide fin 43 are added to the ultraviolet irradiation water treatment apparatus 10K according to the tenth embodiment.

The first guide fin 42 is a downward spiral plate, and the first guide fin 42 is attached to the inner wall of the inflow portion 28.

The second guide fin 43 is a downward spiral plate, and the second guide fin 43 is attached to the outer wall of the recess portion 27H.

In the above-described configuration, in the inflow portion 28, the water W1 is guided to the first guide fin 42 and second guide fin 43, and the water W1 flows while swirling downward. That is, the swirling flow can efficiently be generated. Accordingly, even if the ultraviolet lamps 30A to 30F or the protective tubes 31A to 31F are broken, the fragments of the broken glass or the liquid mercury can be guided to the lowermost contaminant trap container 70 by the centrifugal separation action.

Alternatively, a spiral pitch Po of the first guide fin 42 and a spiral pitch Pi of the second guide fin 43 are gradually narrowed in the flow direction, and an angle of lead of the first guide fin 42 may be larger than an angle of lead of the second guide fin 43. Accordingly, because the swirling flow rate is accelerated in the flow direction, the centrifugal separation force can be improved. The "angle of lead" shall mean an angle formed by a tangent of the spiral line in the cylinder and a plane perpendicular to the axis.

Both the first guide fin 42 and the second guide fin 43 are attached in the eleventh embodiment. However, the same effect is also obtained only by one of the first guide fin 42 and the second guide fin 43. The same effect is obtained by a spiral guide fin, in which the first guide fin 42 and the second guide fin 43, are integrally coupled. That is, a combination of the first guide fin 42 and the second guide fin 43 and a method of fixing the first guide fin 42 and the second guide fin 43 are not limited thereby.

Twelfth Embodiment

Figure 33:
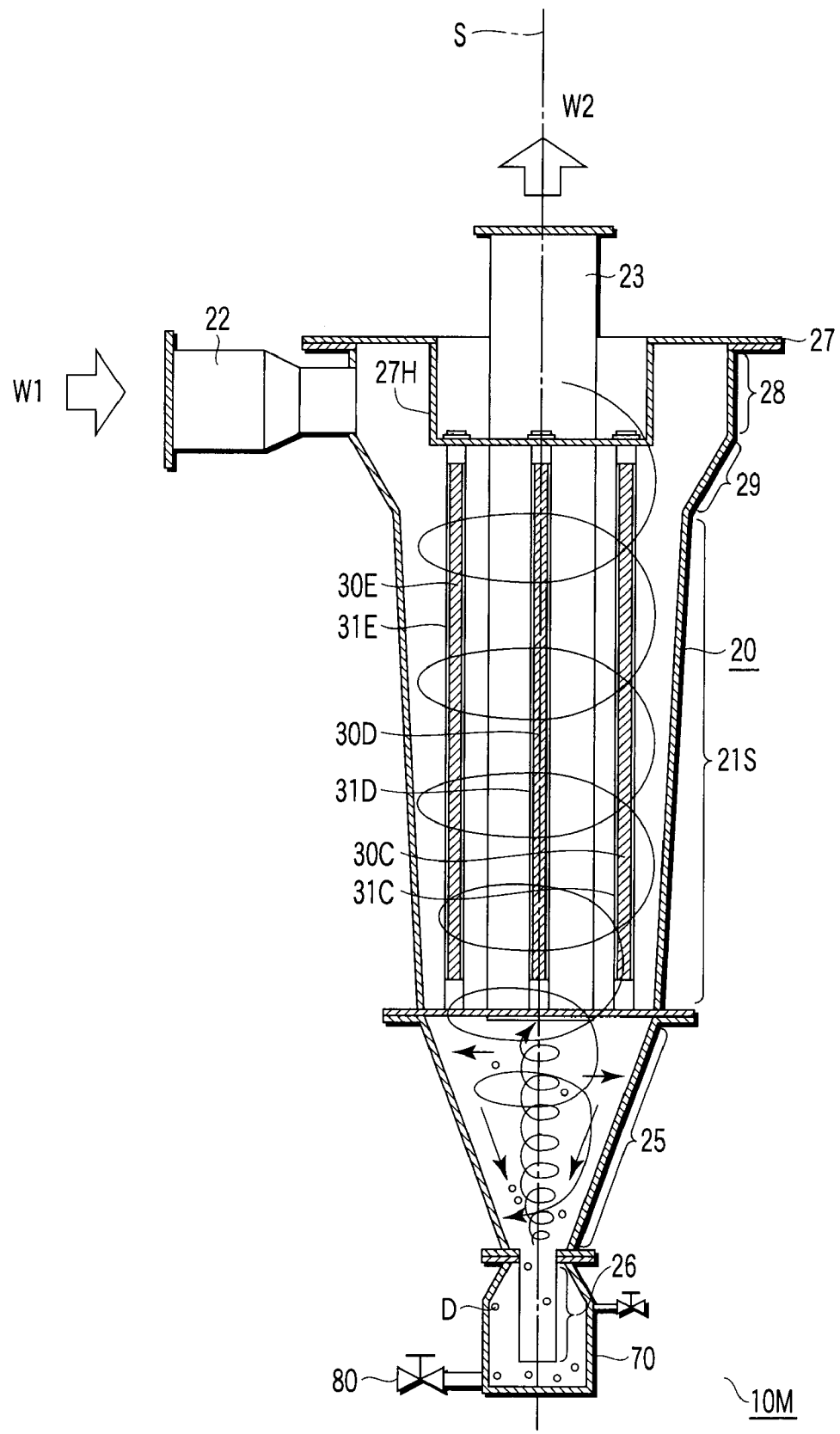
FIG. 33 is a side view showing a configuration of an ultraviolet irradiation water treatment apparatus 10M according to a twelfth embodiment of the invention.
Figure 34:
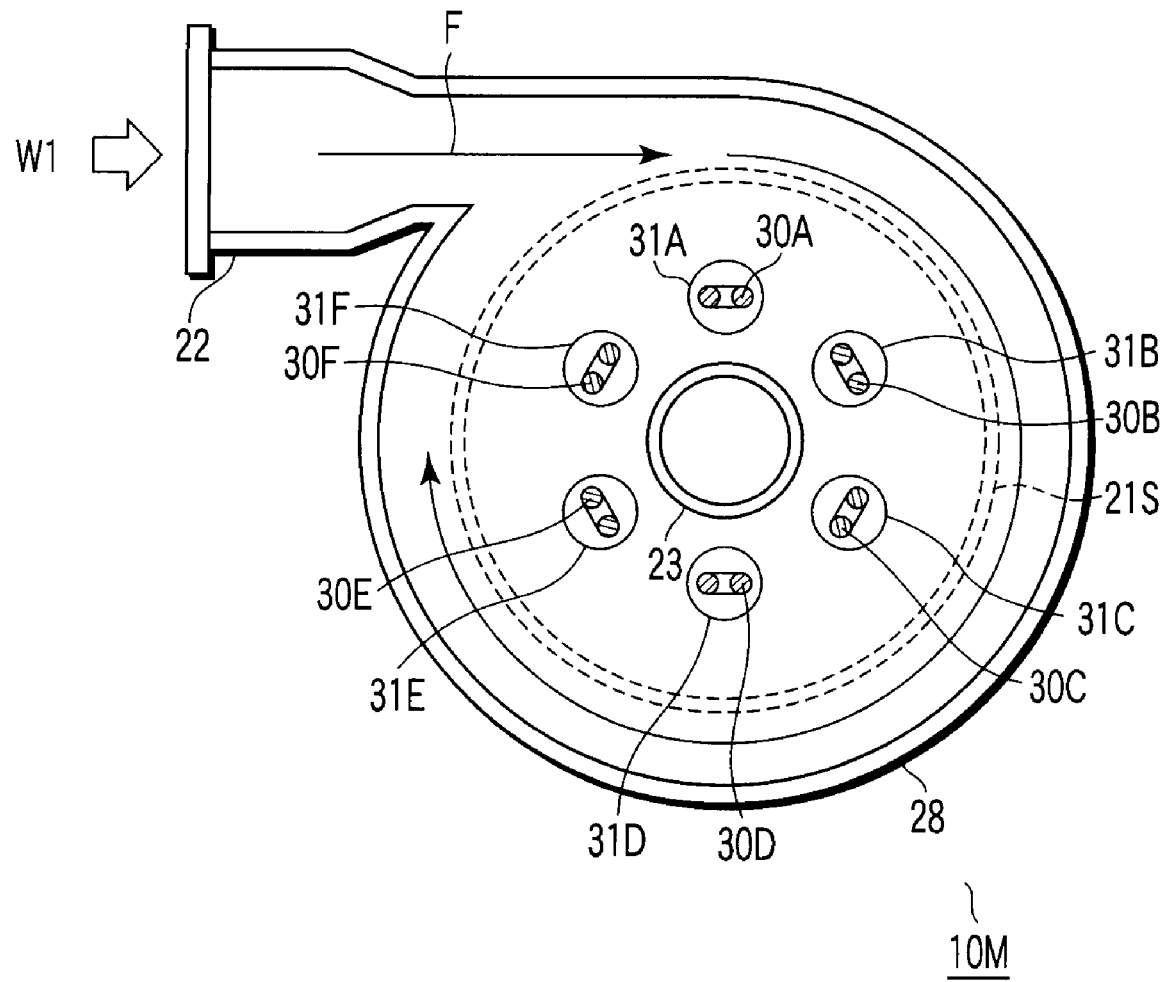
FIG. 34 is a plan view showing the ultraviolet irradiation water treatment apparatus 10M according to the twelfth embodiment.

FIG. 33 is a side view showing a configuration of an ultraviolet irradiation water treatment apparatus 10M according to a twelfth embodiment of the invention, and FIG. 34 is a plan view showing the ultraviolet irradiation water treatment apparatus 10M.

The ultraviolet irradiation water treatment apparatus 10M according to the twelfth embodiment includes a side portion 21S having a reversely truncated conical shape instead of the cylindrical side portion 21 in the vessel 20 of the ultraviolet irradiation water treatment apparatus 10K according to the tenth embodiment.

As described above, the side portion 21S is formed in the reversely truncated conical shape and a sectional area is gradually decreased toward the downward direction. Therefore, the flow rate is gradually accelerated in the swirling flow of the water W1. Accordingly, even if the contaminant D such as a glass fragment and mercury flows out due to the breakage of the ultraviolet lamps 30A to 30F or protective tubes 31A to 31F, the contaminant D can be recovered in the lower portion by the increased centrifugal separation force. That is, the recovery efficiency of the contaminant D can be increased.

In the case of no need for enhancing the recovery efficiency of the contaminant D, the height of the discharge portion 25 can be decreased. In this case, the height of the whole of the apparatus can be decreased.

Thirteenth Embodiment

Figure 36:
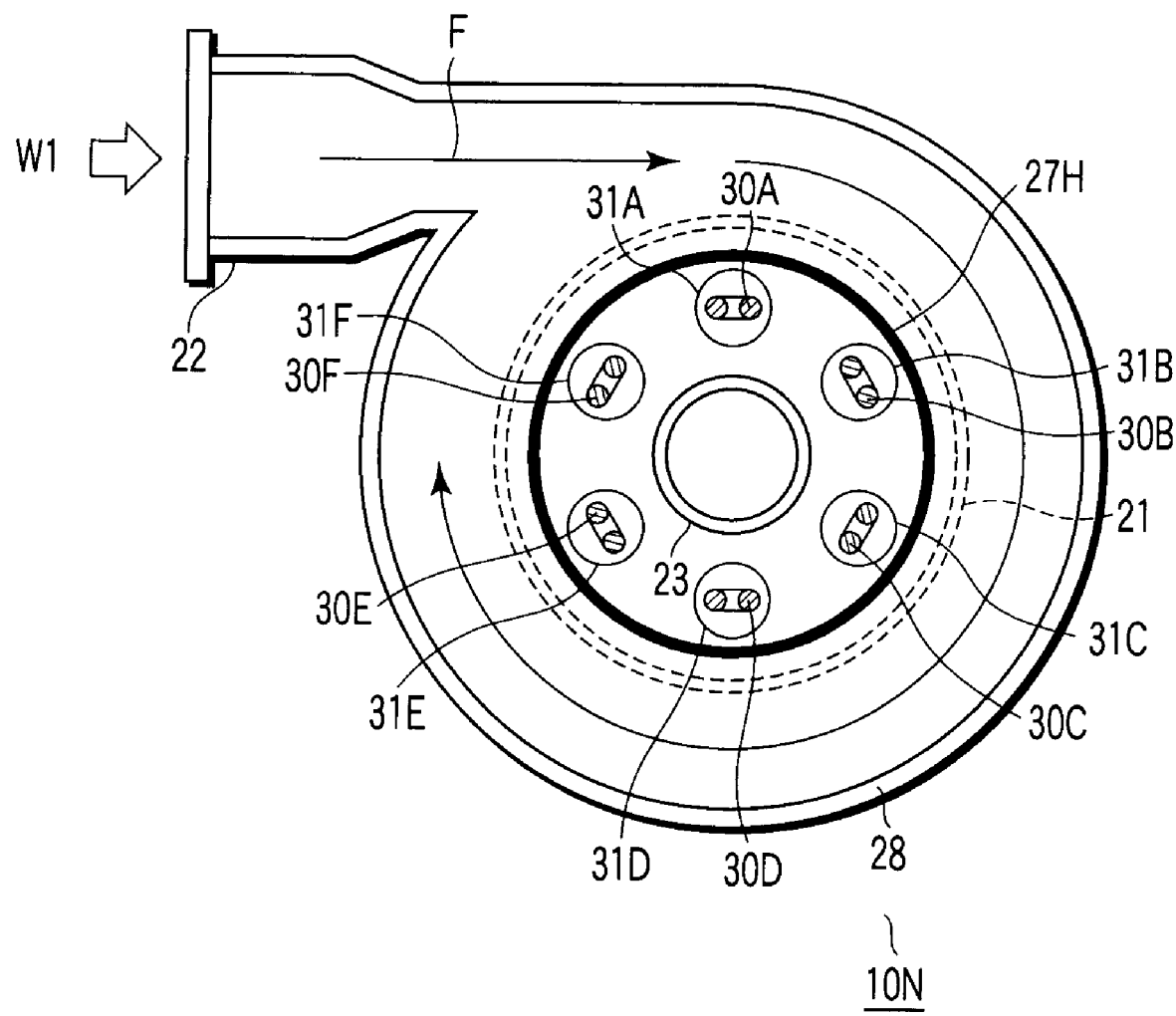
FIG. 36 is a plan view showing the ultraviolet irradiation water treatment apparatus 10N according to the thirteenth embodiment.

FIG. 35 is a side view showing a configuration of an ultraviolet irradiation water treatment apparatus 10N according to a thirteenth embodiment of the invention, and FIG. 36 is a plan view showing the ultraviolet irradiation water treatment apparatus 10N.

In the ultraviolet irradiation water treatment apparatus 10N according to the thirteenth embodiment, the lower end 23L of the water outlet pipe in the ultraviolet irradiation water treatment apparatus 10K according to the tenth embodiment is disposed above the lower ends of the ultraviolet lamps 30A to 30F. Specifically, the lower end 23L of the water outlet pipe is at a height of half of each of the ultraviolet lamps 30A to 30F.

An action of the ultraviolet irradiation water treatment apparatus 10N according to the thirteenth embodiment will be described below with reference to FIGS. 37 and 38. FIG. 37 is a view showing a flow of the water W1 in the ultraviolet irradiation water treatment apparatus 10K, and FIG. 38 is a view showing a flow of the water W1 in the ultraviolet irradiation water treatment apparatus 10N.

As shown in FIG. 37, in the case where the lower end 23L of the water outlet pipe is located at the same height as the lower end of the ultraviolet lamp (lower end of the side portion 21) or below the lower end of the ultraviolet lamp, because the water outlet pipe 23 becomes a shielding substance, the spiral angle (angle of lead) of the swirling flow is increased. Accordingly, the retention region R (left in FIG. 37) is generated in a region on the inflow side of the water W1 to decrease the ultraviolet irradiation efficiency.

Figure 38:
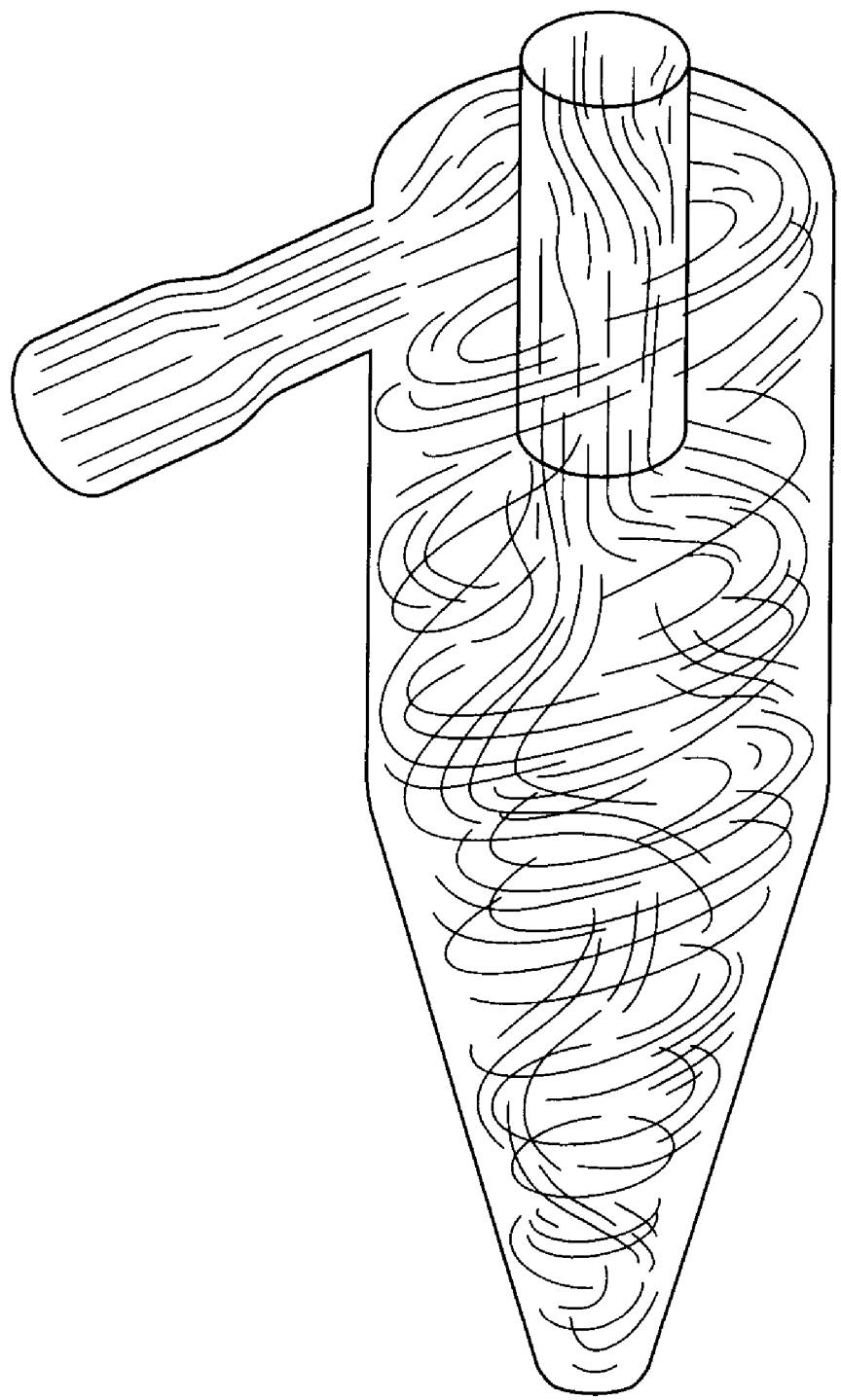
FIG. 38 is a view showing a flow of the water W1 in the ultraviolet irradiation water treatment apparatus 10N according to the thirteenth embodiment.

On the other hand, as shown in FIG. 38, in the case where the lower end 23L of the water outlet pipe is located above the lower end of the ultraviolet lamp, because the swirling flow has a small spiral angle (angle of lead), a retention region R is not generated in the side portion 21.

Thus, in the ultraviolet irradiation water treatment apparatus 10N according to the thirteenth embodiment, the lower end 23L of the water outlet pipe is located above the lower ends of the ultraviolet lamps 30A to 30F, so that retention region R can be prevented from being generated in the side portion 21. That is, the water W1 can swirl efficiently in the whole region of the vessel 20 to enhance the ultraviolet irradiation efficiency.

Additionally, the upward flow going upward from the discharge portion 25 is also irradiated with the ultraviolet ray, so that the ultraviolet irradiation efficiency can be increased.

Fourteenth Embodiment

FIG. 39 is a side view showing a configuration of an ultraviolet irradiation water treatment apparatus 10P according to a fourteenth embodiment of the invention, and FIG. 40 is a plan view showing the ultraviolet irradiation water treatment apparatus 10P.

In the ultraviolet irradiation water treatment apparatus 10P according to the fourteenth embodiment, an outflow portion 45 and a water discharge pipe 46 are added to the ultraviolet irradiation water treatment apparatus 10N according to the thirteenth embodiment.

The cylindrical outflow portion 45 is provided below the cover skirt 27 in a watertight manner, and the outflow portion 45 is coupled to the water outlet pipe 23 in the bottom surface thereof.

The water discharge pipe 46 is provided in the outer wall of the outflow portion 45 so as to pierce through the inflow portion 21, and the water discharge pipe 46 is used to discharge the treated water W2 from the water outlet pipe 23. In this case, the discharge pipe 46 is attached in the direction orthogonal to the central axis S.

The protective tubes 31A to 31F including the ultraviolet lamps 30A to 30F therein are covered with the cover components 32A to 32F, and the protective tubes 31A to 31F are fixed to an upper-end tube plate flange.

Thus, in the ultraviolet irradiation water treatment apparatus 10P according to the fourteenth embodiment, the discharge pipe 46 can be attached in the direction orthogonal to the central axis S. Therefore, the height of the whole of the apparatus can be decreased. Therefore, a space in the upper portion of the apparatus is increased, and the ultraviolet lamps 30A to 30F are easily drawn out and exchanged when the ultraviolet lamps 30A to 30F have broken down.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An ultraviolet irradiation water treatment apparatus comprising:
   a vessel comprising
   a water inlet pipe,
   a side portion which has a cylindrical outer wall and a cylindrical inner wall, the water inlet pipe being provided at the side portion while the inner wall and a part of the outer wall are communicated such that a water is flowed into the vessel in a tangential direction of the inner wall,
   a reversely truncated conical discharge portion which is provided at a lower end of the side portion,
   a lid which closes an upper end of the side portion, and
   a water outlet pipe which is provided on a central axis of the side portion while piercing through the lid;
   rod-shaped ultraviolet lamps which are provided in the vessel and disposed in the lid along a central axis of the side portion;
   protective tubes which respectively surround the ultraviolet lamps; and
   a guide plate having one end which is connected to a connection between the water inlet pipe and the side portion, the guide plate curving to the central axis.

2. An ultraviolet irradiation water treatment apparatus comprising: a vessel including a side portion which has a cylindrical outer wall and a cylindrical inner wall and a reversely truncated conical discharge portion that is provided at a lower end of the side portion;
   a connection pipe that is connected to the reversely truncated conical discharge portion;
   a contaminant trap container that is connected to the connection pipe to accumulate the water discharged through the connection pipe and contaminant contained in the water;
   a water inlet pipe provided at an upper end of the side portion while the inner wall and a part of the outer wall are in fluid communication such that water flows into the vessel in a tangential direction of the inner wall;
   a water outlet pipe that is provided on a central axis of the side portion;

rod-shaped ultraviolet lamps that are provided in the vessel along a central axis of the side portion; and protective tubes that respectively surround the ultraviolet lamps, wherein the water flows into the vessel through the water inlet pipe and flows downward along the tangential direction of the inner wall around the central axis thereof while swirling spirally near outer peripheries of the rod-shaped ultraviolet lamps so that the water rises upward the central axis of the inner wall and is discharged from the water outlet pipe.

3. The ultraviolet irradiation water treatment apparatus according to claim 2, wherein the water outlet pipe is disposed along the central axis, and the water outlet pipe is disposed such that a lower end of the water outlet pipe is located below an intermediate position of a length in an axial direction of the ultraviolet lamps.

4. The ultraviolet irradiation water treatment apparatus according to claim 2, wherein the contaminant trap container is disposed below the connection pipe, and the connection pipe is connected to the contaminant trap container so as to be inserted into the contaminant trap container.

5. The ultraviolet irradiation water treatment apparatus according to claim 2, further comprising:

a cleaning unit configured to scrap the protective tube to wash out a stain;

a drive shaft which drives the cleaning unit while supporting the cleaning unit;

a supporting unit configured to support the cleaning unit while fixing the cleaning unit to the drive shaft, and for moving the cleaning unit along the drive shaft according to rotation of the drive shaft; and a drive motor which rotates the drive shaft.

6. The ultraviolet irradiation water treatment apparatus according to claim 5, wherein the cleaning unit includes:

a semicircular first guide vane type cleaning plate which is obliquely disposed such that a downstream side of a swirling flow of the water is located below an upstream side;

a semicircular second guide vane type cleaning plate which is coupled to the first guide vane type cleaning plate so as to form a circular shape, the semicircular second guide vane type cleaning plate being obliquely disposed to cause the water to further swirl; and a coupling component which couples the first guide vane type cleaning plate and the second guide vane type cleaning plate.

7. The ultraviolet irradiation water treatment apparatus according to claim 2, further comprising a lid that closes an upper end of the side portion.

8. The ultraviolet irradiation water treatment apparatus according to claim 2, further comprising a guide plate having one end that is connected to a connection between the water inlet pipe and the side portion, the guide plate curving toward the central axis.

* * * * *